(12) United States Patent
Muramatsu et al.

(10) Patent No.: US 7,804,535 B2
(45) Date of Patent: Sep. 28, 2010

(54) AD CONVERSION METHOD AND SEMICONDUCTOR DEVICE FOR USE IN PHYSICAL QUANTITY DISTRIBUTION DETECTION

(75) Inventors: Yoshinori Muramatsu, Kanagawa (JP); Noriyuki Fukushima, Kanagawa (JP); Yoshikazu Nitta, Tokyo (JP); Yukihiro Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1169 days.

(21) Appl. No.: 11/119,289

(22) Filed: Apr. 30, 2005

(65) Prior Publication Data

US 2005/0253942 A1    Nov. 17, 2005

(30) Foreign Application Priority Data

May 12, 2004    (JP)    ............................ P2004-142142

(51) Int. Cl.
| | |
|---|---|
| H04N 9/083 | (2006.01) |
| H04N 3/14 | (2006.01) |
| H04N 5/335 | (2006.01) |
| H04N 9/04 | (2006.01) |
| H03M 1/12 | (2006.01) |

(52) U.S. Cl. ..................... 348/273; 341/155; 341/156
(58) Field of Classification Search ......... 348/272–283, 348/294, 297, 307, 302, 308; 341/122, 141, 341/143, 155, 156, 169, 170, 184
See application file for complete search history.

(56) References Cited

U.S. PATENT DOCUMENTS 5,982,318 A * 11/1999 Yiannoulos ................. 341/155

(Continued)

FOREIGN PATENT DOCUMENTS

JP    11-178005    7/1999

(Continued)

OTHER PUBLICATIONS

Yang, W. et al., An Integrated 800-x600 CMOS ImageSystem, ISSCC Digest of Technical Papers, pp. 304-305, Feb. 1999.

(Continued)

*Primary Examiner*—Lin Ye
*Assistant Examiner*—Tuan H Le
(74) *Attorney, Agent, or Firm*—Sonnenschein Nath & Rosenthal LLP

(57) ABSTRACT

In a solid-state imaging device meeting color image pickup, which an AD converter is mounted on the same chip, the circuit scale and the number of transmission signal lines are reduced and a reference signal suitable for color image pickup is fed to an AD conversion comparing portion. DA converter circuits for two pixels of a repeat unit of a separation filter in the horizontal row direction in a unit of readout are prepared as a functional portion to generate a reference signal for AD conversion. The DA converter circuits generate the reference signals having a tilt in accordance with a color property and varying from an initial value based on a non-color property such as a black reference and a circuit offset. Each reference signal independently outputted from the DA converter circuits is basically directly transmitted through common signal lines to a voltage comparing portion which corresponds to color filters having a common color property through independent signal lines.

20 Claims, 14 Drawing Sheets

U.S. PATENT DOCUMENTS

| | | | |
|---|---|---|---|
| 6,271,785 B1* | 8/2001 | Martin et al. | 341/169 |
| 6,545,624 B2* | 4/2003 | Lee et al. | 341/155 |
| 6,633,335 B1* | 10/2003 | Kwon et al. | 348/308 |
| 6,937,279 B1* | 8/2005 | Kim et al. | 348/308 |
| 7,075,474 B2* | 7/2006 | Yamagata et al. | 341/169 |
| 7,148,831 B2* | 12/2006 | Krymski | 341/155 |
| 7,230,558 B2* | 6/2007 | Lim | 341/155 |
| 2002/0122129 A1 | 9/2002 | Lee | |

FOREIGN PATENT DOCUMENTS

| | | |
|---|---|---|
| JP | 2000-236475 | 8/2000 |
| JP | 2000-261602 | 9/2000 |
| JP | 2001-346106 | 12/2001 |
| JP | 2002-232787 | 8/2002 |
| JP | 2002-261602 | 9/2002 |
| JP | 11-331883 | 11/2009 |

OTHER PUBLICATIONS

Yonemoto, K., "CCD/CMOS Image Sensor", First Edition, pp. 200-203, CQ Publishing Co., Ltd., Aug. 10, 2003.

Imamura, T. et al., "Kosoku-kin - Research of High-Speed and High-Function CMOS Image Sensor".

Kwon, Oh-bon, et al., "A Novel Double Slope Analog-to-Digital Converter for a High Quality 640 x 480 CMOS Imaging System", vol. 3-03, IEEEE, pp. 335-338 (1999).

Japanese Office Action dated Oct. 6, 2009, issued in connection with counterpart Japanese Patent Application No. 2004-142142.

* cited by examiner

AD CONVERSION METHOD AND SEMICONDUCTOR DEVICE FOR USE IN PHYSICAL QUANTITY DISTRIBUTION DETECTION

CROSS REFERENCES TO RELATED APPLICATIONS

The present invention contains subject matter related to Japanese Patent Application JP 2004-142142 filed in the Japanese Patent Office on May 12, 2004, the entire contents of which being incorporated herein by reference.

BACKGROUND OF THE INVENTION

1. Field of the Invention

The present invention relates to an AD (analog-to-digital) conversion method and a semiconductor device for use in physical quantity distribution detection in which multiple unit components are arranged. More specifically, the invention relates to a technology that converts analogly outputted electric signals to digital data, the technique is suitable for use in a semiconductor device for use in physical quantity distribution detection such as a solid-state imaging device in which a physical quantity distribution can be optionally selected by addressing control to read as electric signals, the physical quantity distribution in which multiple unit components having sensitivity to electromagnetic waves such as light and radiation externally inputted are arranged and the unit components convert to electric signals. Particularly, the invention relates to a digital data conversion technology in dealing with color information such as a color image.

2. Description of the Related Art

A physical quantity distribution detection semiconductor device are used in various fields, in which multiple unit components (pixels, for example) having sensitivity to electromagnetic waves such as light and radiation externally inputted are arranged in a line or matrix.

For example, in the field of imaging devices, CCD (Charge Coupled Device), MOS (Metal Oxide Semiconductor), and CMOS (Complementary Metal-oxide Semiconductor) solid-state imaging devices are used, which detects light (an example of electromagnetic waves) among physical quantities. These devices read a physical quantity distribution that is converted to electric signals by unit components (pixels in a solid-state imaging device) as electric signals.

In the solid-state imaging devices, there is an amplified solid-state imaging device having a pixel of the configuration of an active pixel sensor (APS, also called a gain cell) that has an amplifying drive transistor in a pixel signal generating portion which generates a pixel signal in accordance with a signal charge generated by a charge generating portion. For example, most of the CMOS solid-state imaging devices have a configuration like this.

In order to read out a pixel signal to outside by the amplified solid-state imaging device like this, address control is done for a pixel portion where multiple unit pixels are arranged, and signals from the individual unit pixels are optionally selected and read out. More specifically, the amplified solid-state imaging device is an example of an address control type solid-state imaging device.

For example, the active pixel sensor, one kind of an X-Y addressing solid-state imaging device where unit pixels are arranged in a matrix, forms pixels using an active device (MOS transistor) of MOS structure for providing an amplification function to the pixel itself. More specifically, signal charge (photoelectron) stored in a photodiode, which is a photoelectric conversion device, is amplified by the active device to read them as image information.

In the X-Y addressing solid-state imaging device of this type, for example, a pixel portion is configured in which a large number of pixel transistors are arranged in a two-dimensional rows and columns, storing signal charge is started in response to incident light at every line (row) or pixel, and signals for current or voltage based on the stored signal charge are in turn read out of each pixel by addressing. Here, in MOS (including CMOS) type, a column parallel readout mode is often used as an example of address control, in which one rows are made access at the same time to read pixel signals by the row from a pixel portion (for example, see Patent Reference 1).

[Patent Reference 1] JP-A-2000-261602

In the solid-state imaging device, analog pixel signals read out of a pixel portion are converted to digital data by an analog-to-digital converter (AD converter), if desired. To this end, various AD conversion schemes are proposed. As an example, a scheme is considered that has a counter and a comparator which compares a sawtooth voltage waveform with an electric signal reflecting a pixel signal (including a pulse width signal) (for example, see Non-Patent References 1 to 5, and Patent References 2 and 3).

[Non-Patent Reference 1] W. Yang et. al., *An Integrated 800×600 CMOS Image System*, ISSCC Digest of Technical Papers, pp. 304-305, February, (1999)

[Non-Patent Reference 2] YONEMOTO Kazuya, *CCD/CMOS image sensor no kiso to oyo*, First Edition, pp. 201-203, CQ Publishing Co., Ltd., Aug. 10, 2003

[Non-Patent Reference 3] IMAMURA Toshihumi and YAMAMOTO Yoshiko, 3. *Kosoku-kino CMOS image sensor no kenkyu*, [online], [search on Mar. 15, 2004], Internet, <URL:http://www.sankaken.gr.jp/project/iwataPJ/report/h12/h12index.html>

[Non-Patent Reference 4] IMAMURA Toshihumi, YAMAMOTO Yoshiko and HASEGAWA Naoya, 3. *Kosoku-kino CMOS image sensor no kenkyu*, [online], [search on Mar. 15, 2004], Internet, <URL:http://www.sankaken.gr.jp/project/iwataPJ/report/h14/h14index.html>

[Non-Patent Reference 5] Oh-Bong Kwon et al., *A Novel Double Slope Analog-to-Digital Converter for a High-Quality 640×480 CMOS Imaging System*, Vol. 3-03 IEEE pp. 335-338 (1999)

[Patent Reference 2] JP-A-11-331883

[Patent Reference 3] JP-A-2002-232787

When a color image is handled, a scheme is considered in which when a sawtooth voltage waveform is compared with an electric signal reflecting a pixel signal for AD conversion, AD conversion is conducted in consideration of color properties of individual pixels having color filters of multiple colors to take color images.

For example, in the technology described in Patent Reference 1, when analog image data is converted to digital image data, reference voltages are generated that are different from each other in accordance with the analog image data property for particular color, and then comparison operation is conducted. Thus, when the analog image data outputted from the unit pixel is converted to digital image data, image data is adjusted depending on individual colors to allow more precise color control.

<The Configuration of a Traditional Solid-State Imaging Device>

FIG. 14 is a diagram illustrating the outline configuration of a solid-state imaging device (CMOS image sensor) in which an AD converter shown in FIG. 4 of Patent Reference 1 is mounted on the same semiconductor substrate as a pixel portion on.

This solid-state imaging device has an analog reference voltage generating portion which generates analog reference voltage that decreases from the initial voltage levels different from each other depending on individual color pixels at different reduction rates, a selecting portion which selectively outputs analog reference voltage depending on the individual color pixels in response to a selection signal, and a comparing portion which compares the analog reference voltage outputted from the selecting portion with analog image data outputted from a pixel array and outputs digital image data, in which analog image data sensed from the individual color pixels of the pixel array is converted to digital image data in accordance with the analog image data property of each color.

As a specific example, as shown in FIG. 14, the solid-state imaging device is configured to have an M (row lines)×N (column lines) pixel array 50 arranged in a Bayer pattern and an analog-to-digital converting portion 60 which converts an analog signal from the pixel array 50 to a digital signal.

The analog-to-digital converting portion 60 is configured to have analog reference voltage generators 601A (Blue), 601B (Green), and 601C (Red) which are prepared to each of color components R, G and B forming a Bayer pattern, comparators 603A and 603B which are disposed for each vertical column, and multiplexers 602A and 602B which select any one of reference signals from the analog reference voltage generators 601A, 601B and 601C and input it to the comparators 603A and 603B.

Here, the analog reference voltage generator is configured of the first reference voltage generator 601A which generates reference voltage with respect to a blue pixel, the second reference voltage generator 601B which generates reference voltage with respect to a green pixel, and the third reference voltage generator 601C which generates reference voltage with respect to a red pixel. Each of the reference voltage generators generates reference voltages having reduction rates different from each other from the initial voltage levels different from each other in accordance with the color properties for which the individual generators are responsible.

The comparators 603A and 603B are disposed by the number of vertical columns (N columns) in total; for example, the comparator 603A is disposed in the odd-numbered column, and the comparator 603B is disposed in the even-numbered column. In accordance with this, the multiplexer 602A is disposed on the input side of the comparator 603A in the odd-numbered columns, and the multiplexer 602B is disposed on the input side of the comparator 603B in the even-numbered columns.

More specifically, the analog reference voltage generators which generate the reference signal that is decreased at different reduction rates from the initial voltage levels different from each other depending on the color pixels, and the selecting portions (multiplexers) which selectively output any one of the reference signals from the analog reference voltage generators at every comparator for each column are disposed.

The multiplexers 602A and 602B selectively output the output signals from the reference voltage generators 601A, 601B and 601C in response to the selection signal SEL. The comparators 603A and 603B compare the output signals from the multiplexers 602A and 602B with the analog signals from the pixel array 50.

In the case of the Bayer pattern, for example, since red pixels or green pixels are arranged on the odd-numbered column lines including the first column line, the third column line, and the fifth column line in the pixel array 50, the multiplexer 602A disposed for the odd-numbered column lines outputs one of the output signals in the second reference voltage generator 601B or the third reference voltage generator 601C depending on the color pixels. On the other hand, since green pixels or blue pixels are arranged on the even-numbered column lines including the second column line, the fourth column line, and the sixth column line, the multiplexer 602B disposed for the even-numbered column lines outputs one of the output signals from the first reference voltage generator 601A or the second reference voltage generator 601B depending on the color pixels.

SUMMARY OF THE INVENTION

However, in the scheme described in Patent Reference 1, each of the analog reference voltage generators generates the reference signal that deceases at different reduction rates from the initial voltage levels different from each other depending on the color pixels. It simply describes 'different from each other depending on the color pixels,' and the detail is not explicit.

According to the study by the inventor, the following was revealed. The reduction rate of the reference signal may be necessary to be adjusted in accordance with the sensitivity property relating to the color property including the color sensitivity of the charge generating portion such as a photodiode forming the color pixel, and the amplification factor of the unit signal generating portion such as an amplifier transistor that converts an electric signal generated by the charge generating portion to a signal charge. However, relating to the initial voltage level, adjustment may not be necessarily conducted relating to the color property of color pixels (the property based on a color filter). Instead, it was found that it is preferable to adjust the initial voltage level from a viewpoint different from that of the color property, for example, black references and circuit offset components.

In the scheme described in Patent Reference 1, in the case of the Bayer arrangement, three analog reference voltage generators are prepared to each of the color components of the color filters for color image pickup such as the first reference voltage generator 601A, the second reference voltage generator 601B, and the third reference voltage generator 601C. The reference signals outputted from each of the analog reference voltage generators are transmitted to the input side of the comparators disposed for each of the vertical columns. The selecting portions (multiplexers) are disposed on the input side of the individual comparators which selectively output any one of the reference signals from each of the analog reference voltage generators.

On this account, a problem arises that the number of signal lines that transmit the reference signals from each of the analog reference voltage generators to the input side of the comparators is required by the number of the color components of the color filters for color image pickup and exceeds the number of the reference signals from each of the analog reference voltage generators, the signals need to be switched on the input side of the individual comparators.

The invention has been made in view of the circumstances. It is desirable to propose a scheme in which a reference signal more preferable for color image pickup and the preferable reference signal is used to allow AD conversion processing.

It is desirable to propose a scheme which can reduce the number of signal lines that transmit a reference signal in accordance with a color pixel to the input side of a comparator fewer than the number of color components of color filters for color image pickup.

In a first AD conversion method according to an embodiment of the present invention, for a reference signal which converts a unit signal to digital data, a reference signal is prepared which has a change property in accordance with the color property of a color filter disposed for a unit component of a processing target and varies from an initial value defined by a viewpoint different from the color property, and the reference signal is inputted to a comparing portion which compares the reference signal with the unit signal and corresponds to color filters having a common color property in a predetermined direction in accordance with a unit of readout for the unit signal.

In a second AD conversion method according to an embodiment of the present invention, a reference signal is basically directly inputted to a comparing portion through a common signal line. The reference signal converts a unit signal to digital data, has a predetermined change property, and varies from a predetermined initial value. The comparing portion compares the reference signal with the unit signal and corresponds to color filters having a common color property in a predetermined direction in accordance with a unit of readout for the unit signal.

A first semiconductor device according to an embodiment of the present invention is a semiconductor device preferable for use in implementing the first AD conversion method according to an embodiment of the present invention. The semiconductor device has a reference signal generating portion which generates a reference signal that has a change property in accordance with the color property of the color filter disposed for a unit component of a processing target and varies from an initial value defined by a viewpoint different from the color property.

A second semiconductor device according to an embodiment of the present invention is a semiconductor device preferable for use in implementing the second AD conversion method according to an embodiment of the present invention. The semiconductor device has a reference signal generating portion which generates a reference signal for AD conversion in which the number of individual reference signal generating and outputting portions is fewer than the number of color components of color filters in a repeat unit for color filter arrangement in a predetermined direction in accordance with a unit of readout and in the direction different from the predetermined direction in accordance with a unit of readout and the number of individual reference signal generating and outputting portions is equal to the number of the color filters in a repeat unit for color filter arrangement in the predetermined direction in accordance with a unit of readout for a unit signal, wherein each of the reference signal independently outputted from the reference signal generating and outputting portions is basically directly transmitted through the common signal line to a comparing portion which corresponds to a color filter having a common color property in a predetermined direction.

According to the first configuration according to an embodiment of the present invention, the AD conversion process is conducted by using the reference signal which has the change property in accordance with the color property and varies from the initial value defined by a viewpoint different from the color property. Therefore, the AD conversion process can be conducted on both the viewpoint of the color property and the viewpoint different from the color property by using the preferable reference signal. Consequently, the signal process more suitable than that traditionally does can be conducted.

According to the second the configuration according to an embodiment of the present invention, the configuration of the reference signal generating portion which generates the reference signal is formed of the individual reference signal generating and outputting portions which generate and output the reference signal, and the reference signal generating and outputting portions are disposed by the number fewer than the number of color components of color filters in a repeat unit for color filter arrangement in a predetermined direction in accordance with a unit of readout and in the direction different from the predetermined direction in accordance with a unit of readout and the individual reference signal generating and outputting portions are disposed by the number equal to the number of the color filters in a repeat unit for color filter arrangement in the predetermined direction in accordance with a unit of readout for a unit signal, wherein each of the reference signal independently outputted from the reference signal generating and outputting portions is basically directly transmitted through the common signal line to a comparing portion which corresponds to a color filter having a common color property in a predetermined direction.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereinafter, embodiments according to the invention will be described in detail with reference to the drawings. An example is taken for description below when a CMOS image pickup device is used as a device, which is one example of X-Y addressing solid-state imaging devices. The CMOS image pickup device will be described as all the pixels are formed of NMOS or PMOS.

However, this is merely an example, and target devices are not necessarily the MOS image pickup devices. All the embodiments, described later, will be adapted to all semiconductor devices for use in physical quantity distribution detection in which multiple unit components having sensitivity to electromagnetic waves such as light and radiation externally inputted are arranged in a line or in a matrix.

First Embodiment

The Configuration of the Solid-State Imaging Device: Bayer Arrangement

Figure 1:
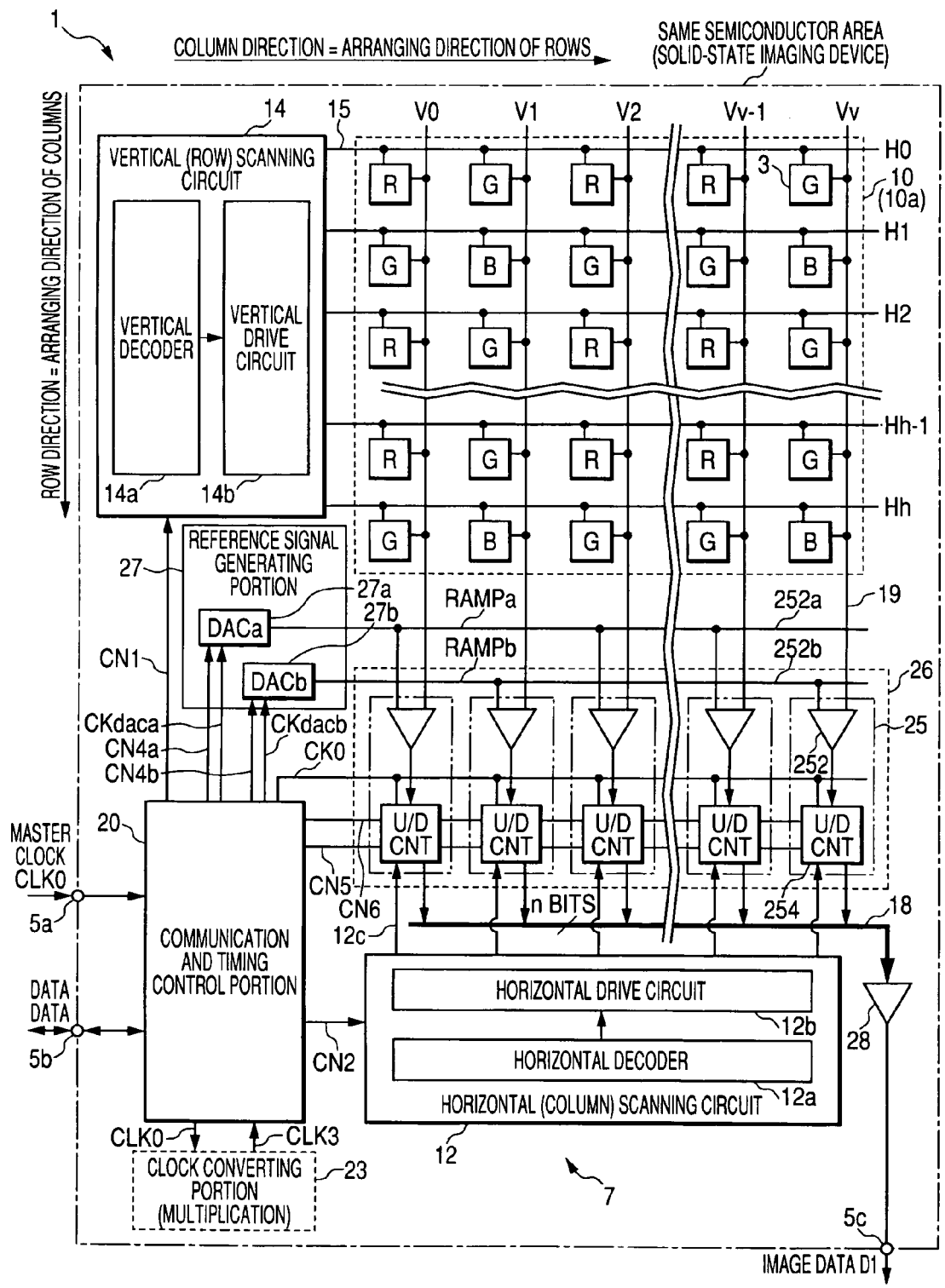
FIG. 1 is a diagram illustrating the outline configuration of a CMOS solid-state imaging device that is a semiconductor device according to a first embodiment of the present invention.
Figure 2:
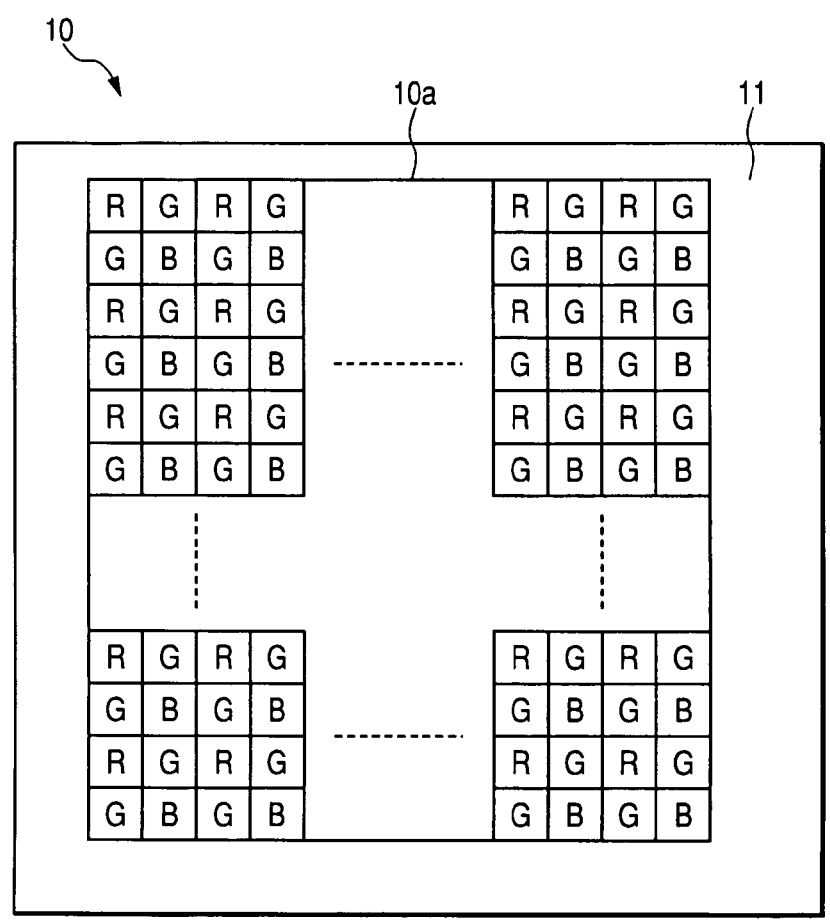
FIG. 2 is a diagram illustrating an example of the relationship between an effective image area and a reference pixel area that provides optical black in a pixel portion.

FIG. 1 is a diagram illustrating the outline configuration of a CMOS solid-state imaging device (CMOS image sensor) that is a semiconductor device according to a first embodiment of the present invention. FIG. 2 is a diagram illustrating an example of the relationship between an effective image area (effective portion) and a reference pixel area that provides optical black in a pixel portion (image pickup portion). The CMOS solid-state imaging device is one form of electronic devices according to an embodiment of the present invention.

A solid-state imaging device 1 has a pixel portion where multiple pixels including light receiving devices (an example of a charge generating portion) that output signals in accordance with incident light quantity are arranged in rows and columns (that is, in a two-dimensional matrix), the signal outputted from each pixel is a voltage signal, and a CDS (Correlated Double Sampling) processing functional portion and a digital converting portion (ADC: Analog Digital Converter) are arranged in column parallel.

'The CDS processing functional portion and the digital converting portion are arranged in column parallel' means that multiple CDS processing functional portions and digital converting portions are arranged basically in parallel with vertical signal lines 19 in the vertical column. It is fine that each of the multiple functional portions is arranged only on one edge side in the column direction (the output side arranged on the lower side of the drawing) with respect to a pixel portion 10 when the device is seen in plan, or is arranged on one edge side (the output arranged on the lower side of the drawing) and the other edge side as the opposite side thereof in the column direction (the upper side of the drawing) with respect to the pixel portion 10. In the latter case, a horizontal scanning portion which conducts readout scanning (horizontal scanning) in the row direction is configured to be also disposed as divided on each edge side for independent operation.

For example, as typical example that the CDS processing functional portions and the digital converting portions are arranged in column parallel, there is a column type in which the CDS processing functional portion and the digital converting portion are arranged at every vertical column in a column area disposed on the output side of an image pickup portion and are sequentially read out to the output side. Not limited to the column type, the following forms can be adopted: a form that a single CDS processing functional portion and a single digital converting portion are assigned to multiple (for example, two) vertical signal lines 19 (vertical columns) and a form that a single CDS processing functional portion and a single digital converting portion are assigned to N of vertical signal lines 19 (vertical columns) every other N lines (N is a positive integer: N−1 lines are arranged therebetween).

Except the column type, since multiple vertical signal lines 19 (vertical columns) are configured to share and use a single CDS processing functional portion and a single digital converting portion in any forms, a switching circuit (switch) is disposed which feeds the pixel signals of multiple columns fed from the pixel portion 10 to a single CDS processing functional portion and a single digital converting portion. Depending on the process in the subsequent stage, a scheme may be necessary to dispose memory which holds output signals.

In any cases, the form is adopted that a single CDS processing functional portion and a single digital converting portion are assigned to multiple vertical signal lines 19 (vertical columns), and the signal process for each of the pixel signals is conducted after signals are read by the pixel column unit. Thus, the configuration inside each unit pixel can be more simplified than that conducting the signal process inside each unit pixel, and can be ready for a multi-pixel image sensor, reduction in size, and low costs.

Since the multiple signal processing portions arranged in column parallel can conduct parallel processing for the pixel signals in a single row at the same time, the signal processing portion can be operated at lower speed than processing the signals by a single CDS processing functional portion and a single digital converting portion on the output circuit side and outside the device, having advantages on power consumption, band performance and noise. Conversely, when power consumption and band performance are formed the same, the entire sensor can be operated at high speed.

In the column type configuration, it can be operated at low speed and has advantages on power consumption, band performance and noise as well as a switching circuit (switch) is unnecessary. In embodiments below, the column type is used for description, without specially noted.

As shown in FIG. 1, the solid-state imaging device 1 of the first embodiment has the pixel portion (image pickup portion) 10 which has multiple unit pixels 3 generally in a square pixel arranged in rows and columns (that is, in a square grid), a drive control portion 7 which is disposed outside the pixel portion 10, a column processing portion 26, a reference signal generating portion 27 which feeds AD conversion reference voltage to the column processing portion 26, and an output circuit 28.

In the previous stage or the subsequent stage of the column processing portion 26, an AGC (Auto Gain Control) circuit having a signal amplification function can be disposed in the same semiconductor area as the column processing portion 26 in, if desired. It is analog amplification when AGC is conducted in the previous stage of the column processing portion 26, whereas it is digital amplification when AGC is conducted in the subsequent stage of the column processing portion 26. Since the gray scale is likely to be damaged when n-bit digital data is simply amplified, it may be preferable that data is analogly amplified and then digitally converted.

The drive control portion 7 has a control circuit function that sequentially reads out the signals of the pixel portion 10. For example, the drive control portion 7 has a horizontal scanning circuit (column scanning circuit) 12 which controls column addresses and column scanning, a vertical scanning circuit (row scanning circuit) 14 which controls row addresses and row scanning, and a communication and timing control portion 20 which has a function of generating an internal clock.

In the drawing, as denoted by dotted lines near the communication and timing control portion 20, a clock converting portion 23 of an example of a high speed clock generating portion may be disposed, which generates a pulse of a clock frequency higher than the inputted clock frequency. The communication and timing control portion 20 generates the internal clock based on the input lock (master clock) CLK0 that is inputted through a terminal 5a and the high speed clock generated by the clock converting portion 23.

The use of the signal originated from the high speed clock generated by the clock converting portion 23 allows operating the AD conversion process at high speed. The use of the high speed clock allows motion extraction and compression processing that may need computation at high speed. Parallel data outputted from the column processing portion 26 is formed into serial data to allow image data D1 to be outputted outside the device. Accordingly, the configuration can be adopted in which the number of the terminals fewer than the number of bits for AD converted digital data allows high speed operation output.

The clock converting portion 23 has a multiplier circuit therein which generates a pulse of a clock frequency higher than the inputted clock frequency. The clock converting portion 23 receives the low speed clock CLK2 from the communication and timing control portion 20, and generates from that clock a clock of a frequency two times that of the low speed clock or more. For the multiplier circuit of the clock converting portion 23, a k1 multiplier circuit may be disposed when k1 is a multiple of the frequency of the low speed clock CLK2, and various known circuits can be used.

In FIG. 1, a part of the rows and columns is omitted for convenience, but in practice, a few tens to a few thousands of unit pixels 3 are arranged for each row and each column to configure the pixel portion 10. Typically, the unit pixel 3 is configured of a photodiode as a light receiving device (charge generating portion), and an amplifier inside the pixel having an amplification semiconductor device (for example, a transistor).

For the amplifier inside the pixel, the configuration of a floating diffusion amplifier, for example, is used. As an example, four general purpose transistors as a CMOS sensor can be used for the charge generating portion: a readout selection transistor as an example of a charge readout portion (transfer gate portion/readout gate portion), a reset transistor as an example of a reset gate portion, a vertical selection transistor, and an amplifier transistor of a source follower configuration as an example of a detection device that detects electric change in floating diffusion.

Alternatively, as described in Japanese Patent No. 2708455, the configuration formed of three transistors may be used: an amplifier transistor that is connected to a drain line (DRN) to amplify signal voltage corresponding to signal charge generated by a charge generating portion, a reset transistor that resets the charge generating portion, and a readout selection transistor (transfer gate portion) that is scanned by a vertical shift register through a transfer line (TRF).

In addition to an effective image area (effective portion) 10a being the effective area that acquires an image, the pixel portion 10 is configured in which a reference pixel area 10b which provides optical black is arranged around the effective image area (effective portion) 10a, as shown in FIG. 2. As an example, reference pixels which provide optical blacks by a few rows (for example, 1 to 10 rows) are arranged above and below in the vertical column direction, and alternatively, reference pixels which provide optical blacks by a few to a few tens pixels (for example, 3 to 40 pixels) are arranged right and left in horizontal rows including the effective image area (effective portion) 10a.

The reference pixel which provides optical black is shielded on its light receiving surface side so as not to enter light into the charge generating portion formed of a photodiode. The pixel signal from the reference pixel is used for the black reference of the image signal.

The solid-state imaging device 1 of the first embodiment forms the pixel portion 10 to meet color image pickup. More specifically, any one of color filters of a color separation filter formed of the combination of color filters of multiple colors for color image pickup is formed on the light receiving surface of each of the charge generating portions (such as photodiodes) of the pixel portion 10, the surface onto which electromagnetic waves (light in the embodiment) enter.

The example shown in the drawing uses basic color filters of a so-called Bayer arrangement in which the pixel portion 10 is formed by arranging repeat units for the color separation filter by two pixels×two pixels so that the unit pixels 3 arranged in a square grid correspond to three color filters, red (R), green (G), and blue (B).

For example, a first color pixel which senses a first color (red: R) is arranged in the odd-numbered row and the odd-numbered column, a second color pixel which senses a second color (green: G) is arranged in the odd-numbered row and the even-numbered column and in the even-numbered row and the odd-numbered column, and a third color pixel which senses a third color (blue: B) is arranged in the even-numbered row and the even-numbered column; two color pixels of R/G or G/B varied at every row are arranged in a checkered pattern.

In the color arrangement of basic color filters in the Bayer arrangement like this, two colors of R/G or G/B are repeated two each at in every row direction and column direction.

For the other components of the drive control portion 7, the horizontal scanning circuit 12, the vertical scanning circuit 14, and the communication and timing control portion 20 are disposed. The horizontal scanning circuit 12 has a function of a readout scanning portion which reads a count value from the column processing portion 26. Each of the components in the drive control portion 7 is formed along with the pixel portion 10 integrally in a semiconductor area such as a silicon single crystal by using a technology similar to semiconductor integrated circuit fabrication technology, and is formed as the solid-state imaging device (image pickup device) as an example of a semiconductor system.

The unit pixel 3 is connected to the vertical scanning circuit 14 through a row control line 15 for row selection, and to the column processing portion 26 where the column AD circuit 25 is disposed at every vertical column through the vertical signal line 19. Here, the row control line 15 shows the general wiring that enters from the vertical scanning circuit 14 to the pixels.

The horizontal scanning circuit 12 and the vertical scanning circuit 14 are configured to include a decoder, described later, and to start the shifting operation (scanning) in response to the control signals CN1 and CN2 fed by the communication and timing control portion 20. Therefore, the row control line 15 includes various pulse signals (for example, the reset pulse RST, the transfer pulse TRF, and the DRN control pulse DRN) for driving the unit pixel 3.

The communication and timing control portion 20 has, not shown in the drawing, a function block of a timing generator TG (an example of a readout address control apparatus) which feeds a clock necessary for operating each portion and a pulse signal at a given timing, and a function block of a communication interface which receives the master clock CLK0 through the terminal 5a, receives data DATA that instructs an operation mode through a terminal 5b, and outputs data containing information about the solid-state imaging device 1.

For example, the horizontal address signal is outputted to the horizontal decoder 12a, whereas the vertical address signal is outputted to the vertical decoder 14a, and the individual decoders 12a and 14a receive it to select the corresponding row or column.

At this time, since the unit pixels 3 are arranged in a two-dimensional matrix, the analog pixel signal that is generated by the pixel signal generating portion 5 and outputted in the column direction through the vertical signal line 19 is made access and captured (vertically) by the row unit (in column parallel), and undergoes scanning read. Then, the pixel signal is made access in the row direction of the arranging direction of vertical columns, and the pixel signal (digitized pixel data in the embodiment) is read out to the output side for (horizontal) scanning read. Thus, the readout of the pixel signal and pixel data may be conducted at high speed. Of course, in addition to scanning read, the unit pixel 3 desired to read is directly addressed to allow random access that reads only information about the necessary unit pixel 3.

The communication and timing control portion 20 according to the first embodiment feeds the clock CLK1 having the same frequency as the master clock (master clock) CLK0 that is inputted through the terminal 5a, a clock that the clock CLK1 is divided into two, and a low speed clock further divided to the inside of the device, for example, the horizontal scanning circuit 12, the vertical scanning circuit 14, and the column processing portion 26. Hereinafter, the clock that is divided into two and clocks having that frequency or below are all called the low speed clock CLK2.

The vertical scanning circuit 14 selects a row of the pixel portion 10, and feeds a pulse necessary to that row. For example, it has the vertical decoder 14a which defines the readout row in the vertical direction (selects a row of the pixel portion 10), and a vertical drive circuit 14b which feeds a pulse to the row control line 15 for the unit pixel 3 on the readout address defined by the vertical decoder 14a (in the row direction) for drive. The vertical decoder 14a also selects a row for an electronic shutter, in addition to the row for reading signals.

The horizontal scanning circuit 12 in turn selects the column AD circuits 25 in the column processing portion 26 in synchronization with the low speed clock CLK2, and leads the signal to a horizontal signal line (horizontal output line) 18. For example, it has the horizontal decoder 12a which defines a readout column in the horizontal direction (selects the individual column AD circuits 25 in the column processing portion 26), and a horizontal drive circuit 12b which leads each signal of the column processing portion 26 to each of the horizontal signal lines 18 in accordance with the readout address defined by the horizontal decoder 12a. The horizontal signal lines 18 are disposed so that they correspond to the bit number of n (n is a positive integer) that the column AD circuit 25 handles by ten lines when the bit number is 10 (=n) bits, for example.

In the solid-state imaging device 1 of the configuration like this, the pixel signal outputted from the unit pixel 3 is fed to the column AD circuits 25 in the column processing portion 26 through the vertical signal lines 19 at every vertical column.

Each of the column AD circuits 25 in the column processing portion 26 receives signals of pixels in one column, and processes the signals. For example, each of the column AD circuits 25 has an ADC (Analog Digital Converter) circuit which converts the analog signal to 10-bit digital data using the low speed clock CLK2, for example.

The configuration of the ADC circuit will be described in detail later. AD conversion is conducted in which the ramp reference signal (reference voltage) RAMP is fed to a comparator (voltage comparator), count (counting) is started by the clock signal at the same time, and the analog pixel signal inputted through the vertical signal line 19 is compared with the reference signal RAMP for count until the pulse signal is obtained.

At this time, the circuit configuration is devised to allow a process that takes a difference between the signal level (noise level) right after the pixel is reset and a true signal level Vsig (in accordance with the received light quantity) with respect to the pixel signal in a voltage mode inputted through the vertical signal line 19 as well as AD conversion. Accordingly, noise signal components called fixed pattern noise (FPN) and reset noise can be eliminated.

The pixel data digitized by the column AD circuit 25 is transmitted to the horizontal signal line 18 through a horizontal selection switch, not shown, which is driven by the horizontal selection signal from the horizontal scanning circuit 12, and further inputted to the output circuit 28. Ten bits is an example, and any other bit numbers are acceptable such as below ten bits (for example, eight bits) and bit numbers exceeding ten bits (for example, 14 bits).

By the configuration like this, the pixel signal is sequentially outputted from each vertical column at every row from the pixel portion 10 where light receiving devices as the charge generating portions are arranged in rows and columns. A sheet of an image corresponding to the pixel portion 10 where the light receiving devices are arranged in rows and columns, that is, a frame image is shown by a set of the pixel signals of the entire pixel portion 10.

<The Detail of the Column AD Circuit and the Reference Signal Generating Portion>

The reference signal generating portion 27 separately has the DA converter circuits (DAC) which are function components generating the reference signal for AD conversion in accordance with color types and arrangement of the color filters forming the color separation filter in the pixel portion 10.

When the pixel portion 10 (device) for use is decided, the color types and arrangement of the color filters of the color separation filter are determined, and then what color the color filter has at a given position can be uniquely identified at the two-dimensional grid positions. Each of the repeat cycles of the color filters in the row direction and the column direction is also uniquely determined, and only the pixel signals of a fewer predetermined combinations of colors determined by the repeat cycles are in a single processing target row of a processing target by each of the column AD circuits 25 disposed in column parallel, not by full colors used in the color separation filter.

In the embodiment, attention is focused on this characteristic. When the AD conversion circuit is configured of a comparator circuit and a counter, the DA converter circuits are not disposed by the number of the full colors used for the color separation filter, but are first disposed by the number of the combinations of the color filters of predetermined colors in a repeat cycle for the color filters relating to the row direction that is a unit of readout for the pixel signal, the DA converter circuit being an example of the individual reference signal generating and outputting portions that are the function component generating the reference signal for AD conversion fed to the comparator circuit. Thus, the number of the DA converter circuits is reduced fewer than the full colors of the color filters in a repeat cycle for the color filter in two dimensions.

It is configured that the reference signals RAMPa and RAMPb independently outputted from the individual DA converter circuits 27a and 27b are basically directly transmitted through signal lines 252a and 252b separately to a voltage comparing portion 252 corresponding to color filters having a common color property through the common signal lines 252a and 252b.

Relating to the direction different from the row direction in accordance with a unit of readout, that is, the vertical column direction, the color corresponding reference signal generating portions are disposed for the individual DA converter circuits (reference signal generating and outputting portions) by the number of the combinations of the color filters of predetermined colors in a repeat cycle for the color filters in the vertical column direction, and any one of the individual outputs is selected in accordance with switching a processing target row, the color corresponding reference signal generating portion varies with a change property corresponding to the color property of the color pixel (more specifically, a tilt) and with the initial value defined by the viewpoint of the non-color property different from the change property from the color property such as the black reference and the circuit offset component.

In this case, as the Bayer arrangement, for example, when the color filters of the same color exist in a repeat cycle for the color filters in two dimensions, the individual DA converter circuits (reference signal generating and outputting portions) may be configured to share a single color corresponding reference signal generating portion relating to the color filters of the same color.

Alternatively, to the individual DA converter circuits (reference signal generating and outputting portions), in accordance with changing the combinations of colors forming a repeat unit for color filter arrangement associated with the switching at every time when processing target rows are switched, the communication and timing control portion 20 may set the initial value based on the change property (more specifically, a tilt) corresponding to the color property of the corresponding color pixel and on the viewpoint different from the color property such as the black reference and the circuit offset component. Accordingly, it is unnecessary to dispose the color corresponding reference signal generating portion and the selecting portion selects any one of the color corresponding reference signal generating portion for the individual DA converter circuits (reference signal generating and outputting portions).

In any configurations, in accordance with switching a processing target row to switch predetermined combinations of colors in that processing target row, the individual DA converter circuits (reference signal generating and outputting portions) switch and output the change property (more specifically, a tilt) of the reference signal (analog reference voltage) sent from the DA converter circuit, in accordance with the property of the color filter, that is, the analog pixel signal. Relating to the initial value, it is set based on the viewpoint different from the color property such as the black reference and the offset component of the circuit.

Accordingly, the number of the reference voltage generators (it is equivalent to the DA converter circuit in the embodiment) and the number of wirings from the reference voltage generators can be reduced fewer than the number of the color filters forming the color separation filter. The selecting portion (the multiplexers) at every vertical column are also eliminated which is required when the reference voltage generator is prepared for each color filter (Patent Reference 1) and selectively outputs the analog reference voltage (it is equivalent to the reference signal in the embodiment) from each of the reference voltage generators. Therefore, the circuit scale can be decreased. The number of signal lines that transmit the reference signal in accordance with the color pixel to the input side of the comparator can be reduced fewer than the number of color components of the color filters for color image pickup.

When the change property (more specifically, a tilt) and the initial value are set in the DA converter circuits in accordance with changing the combinations of colors forming a repeat unit for color filter arrangement associated with switching every time when a processing target row is switched, it is unnecessary to dispose the color corresponding reference signal generating portions corresponding to the individual color filters and the selecting portion which switches the color corresponding reference signal generating portion in accordance with a processing target row (see specific examples 1 to 5, described later), and the overall scale of the configuration of the reference signal generating portion 27 can be further reduced (see specific example 6, described later).

In this embodiment, a device of Bayer mode basic arrangement is used for the solid-state imaging device 1, and a repeat of color filters is two rows and two columns each, as described above. Since the pixel signals are read by the row unit and the pixel signals are inputted to each of the column AD circuits 25 in column parallel at every vertical signal line 19, the pixel signals of two colors, R/G or G/B, only exist in a single processing target row. Therefore, in the embodiment, the DA converter circuit 27a corresponding to the odd-numbered columns and the DA converter circuit 27b corresponding to the even-numbered columns are disposed.

The individual DA converter circuits 27a and 27b generate a sawtooth wave (ramp voltage) in steps from the initial value indicated by control data CN4 (CN4a and CN4b) from the communication and timing control portion 20 in synchronization with the count clocks CKdaca and CKdacb (they are fine to be the same as the count clock CK0) from the communication and timing control portion 20, and feed the generated sawtooth wave as the AD conversion reference signals (ADC reference signals) RAMPa and RAMPb to the individual column AD circuits 25 corresponding to the column processing portion 26. As omitted in the drawing, an anti-noise filter may be provided.

When the DA converter circuits 27a and 27b conduct the AD conversion process using the voltage comparing portions 252 and the counter portions 254 for the signal component Vsig of the pixel signal Vx at a given position as the unique function of the embodiment, they have a feature in that the initial voltage of the reference signals RAMPa and RAMPb sent from each of the circuits is set to a value different from the value in the AD conversion process for the reset component $\Delta V$ with reflecting the pixel property and circuit variations as well as color filter arrangement is considered to set tilts $\beta a$ and $\beta b$ for the circuits so as to fit the pixel property.

More specifically, first, suppose the initial voltages Vas and Vbs of the reference signals RAMPa and RAMPb for the signal component Vsig are computed based on the signals obtained from the pixels generating given multiple black references. The pixel generating the black reference is the pixel having a shielding layer on the photodiode as the photoelectric conversion device that forms the charge generating portion 32 placed outside the color pixel. The arrangement form such as the placed location and the number of places and the shielding portion are not defined particularly, and publicly known schemes can be adopted.

Suppose the initial voltage includes native variation components, each of them being generated from the property of each of the DA converter circuits 27a and 27b. Typically, the initial voltages Vas and Vbs are reduced by the offsets OFFa and OFFb with respect to the initial voltages Var and Vbr of the reference signals RAMPa and RAMPb on the reset component $\Delta V$.

Typically, since the offsets OFFa and OFFb have different values even though the initial voltages Var and Vbr of the reference signals RAMPa and RAMPb on the reset component $\Delta V$ are the same, the initial voltages Vas and Vbs of the reference signals RAMPa and RAMPb on the signal component Vsig are varied.

The initial voltages Vas and Vbs of the reference signals RAMPa and RAMPb on the signal component Vsig may include given offsets other than the signal obtained from the pixel generating the black reference.

The control of the offsets OFFa and OFFb done by the individual DA converter circuits 27a and 27b in the reference signal generating portion 27 may be conducted in which, for example, a function of computing the initial voltage based on the signal obtained from the reference pixel generating given multiple black references is provided to the communication and timing control portion 20 and the control is done based on the initial value indicated by the control data CN4 from the communication and timing control portion 20. Of course, it is fine that the DA converter circuits 27a and 27b have the function of computing the initial voltage and they compute the initial voltage by themselves.

Alternatively, the function of computing the initial voltage of the reference voltage is not provided to the communication and timing control portion 20 and the DA converter circuits 27a and 27b in the chip, it is acceptable that the initial voltage is computed based on the signal obtained from the reference pixel generating the black reference by an external system outside the chip, information indicating the initial voltage as a part of the operation mode is notified to the communication and timing control portion 20 through the terminal 5b, and the reference signal generating portion 27 is notified by the control data CN4 from the communication and timing control portion 20.

The reference signal in steps sent by the reference signal generating portion 27, more specifically, the reference signal RAMPa sent by the DA converter circuit 27a and the reference signal RAMPb sent by the DA converter circuit 27b are generated based on the high speed clock from the clock converting portion 23, for example, the multiplication clock generated by the multiplier circuit, and thus can be varied at higher speed than being generated based on the master clock CLK0 inputted through the terminal 5a.

The control data CN4a and CN4b fed to the DA converter circuit 27a in the reference signal generating portion 27 from the communication and timing control portion 20 also includes information that instructs a tilt (a degree of change: a time varying amount) of the ramp voltage at every comparison process.

The column AD circuit 25 is configured to have the reference signal RAMP which is generated by the DA converter circuit 27a in the reference signal generating portion 27, the voltage comparing portion (comparator) 252 which compares the analog pixel signals obtained from the unit pixels 3 through the vertical signal lines 19 (V0, V1, and so on) at each of the row control lines 15 (H0, H1, and soon), and the counter portion 254 which counts the time until the voltage comparing portion 252 finishes the comparison process and holds the result, and also has an n-bit AD conversion function.

The communication and timing control portion 20 has the function of a control portion which switches the count process mode in the counter portion 254 in accordance with whether the voltage comparing portion 252 is doing the comparison process on any one of the reset component $\Delta V$ and the signal component Vsig of the pixel signal. To the counter portion 254 of each of the column AD circuits 25, the control signal CN5 is inputted from the communication and timing control portion 20, which instructs whether the counter portion 254 is operated by the down count mode or the up count mode.

To one input terminal RAMP of the voltage comparing portion 252 in common with the input terminal RAMP of the other voltage comparing portions 252, the reference signal RAMP in steps is inputted that is generated by the reference signal generating portion 27. To the other input terminal, the vertical signal line 19 of the corresponding vertical column is connected and the pixel signal voltages are separately inputted from the pixel portion 10. The output signal of the voltage comparing portion 252 is fed to the counter portion 254.

To the clock terminal CK of the counter portion 254, the count clock CK0 is inputted from the communication and timing control portion 20 in common with the clock terminal CK of the other counter portions 254.

Figure 6:
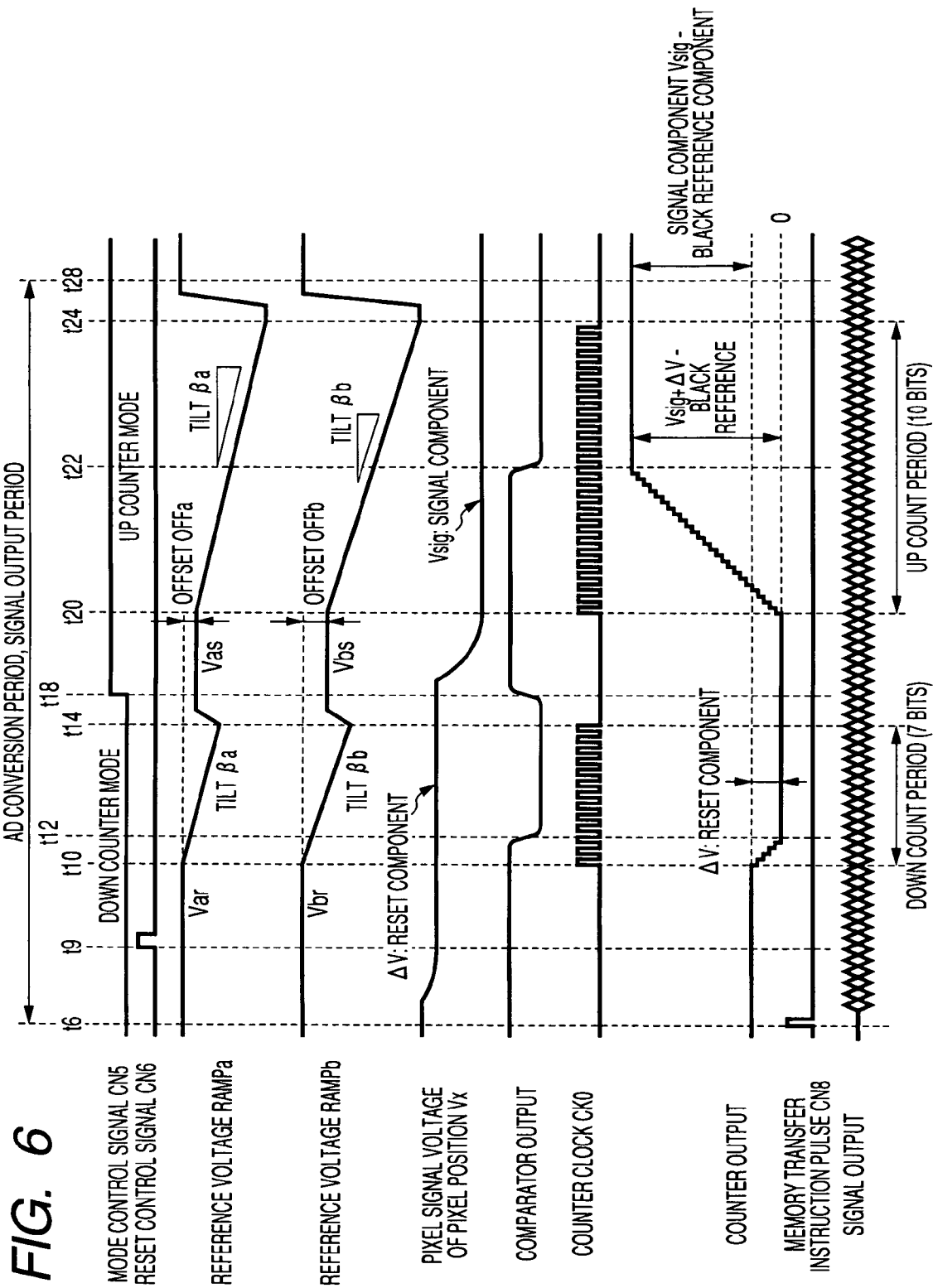
FIG. 6 is a timing chart for describing the basic operation of a column AD circuit of the solid-state imaging device according to the second embodiment shown in FIG. 5.

The configuration of the counter portion 254 is not shown in the drawing, but it can be implemented by modifying the wiring form of a data storing portion 255 formed of latches shown in FIG. 6 to a synchronous counter form, and a single input of the count clock CK0 allows internal counts. As similar to the voltage waveform in steps, the count clock CK0 is generated based on the high speed clock (for example, the multiplication clock) from the clock converting portion 23, and thus it is made faster than the master clock CLK0 inputted through the terminal 5a.

The combination of n of latches can implement an n-bit counter portion 254, and it is a half of the circuit scale of the data storing portion 255 formed of n of latches in two lines shown in FIG. 6. In addition to this, since the counter portion 254 is unnecessary, it is significantly more compact overall than the configuration shown in FIG. 6.

Here, the counter portion 254 of the first embodiment will be described in detail later, but it has a feature in that it is configured to allow the count process in which a common up down counter (U/D CNT) is used to switch between the down count operation and the up count operation (more specifically, alternately) regardless of the count mode. The counter portion 254 of the first embodiment uses a synchronous counter which the count output value is outputted in synchronization with the count clock CK0.

In the case of the synchronous counter, the operation of all the flip flops (counter basic components) is constrained by the count clock CK0. Therefore, when the higher frequency operation is desired, the operation limiting frequency is determined only by the limiting frequency of the first flip flop (counter basic component) in the counter portion 254, and thus the asynchronous counter suitable for the high speed operation is used more preferably.

To the counter portion 254, a control pulse is inputted from the horizontal scanning circuit 12 through the control line 12c. The counter portion 254 has a latch function of holding the count result, and holds the counter output value until it receives an instruction by the control pulse through the control line 12c.

As described above, the column AD circuit 25 of the configuration like this is disposed at each of the vertical signal lines 19 (V0, V1, and so on) to configure the column processing portion 26 being the ADC block of the column parallel configuration.

The output side of the individual column AD circuits 25 is connected to the horizontal signal line 18. As describe above, the horizontal signal line 18 has an n-bit width signal line that is the bit width of the column AD circuit 25, and is connected to the output circuit 28 through n of sense circuits corresponding to respective output lines, not shown.

In this configuration, the column AD circuit 25 conducts the count operation during a pixel signal readout period equivalent to a horizontal blanking period, and outputs the count result at a predetermined timing. More specifically, the voltage comparing portion 252 first compares the ramp waveform voltage from the reference signal generating portion 27 with the pixel signal voltage inputted through the vertical signal line 19. When both voltages become equal, the comparator output of the voltage comparing portion 252 is inverted (changed from the high level to the low level in the embodiment).

The counter portion 254 has already started the count operation in the down count mode or the up the count mode in synchronization with the ramp waveform voltage sent from the reference signal generating portion 27. When information that the comparator output is inverted is notified to the counter portion 254, it stops the count operation and latches (holds and stores) the count value at that time as pixel data to end AD conversion.

After that, the counter portion 254 sequentially outputs the pixel data stored and held to outside the column processing portion 26 and outside the chip having the pixel portion 10 through an output terminal 5c based on the shifting operation by the horizontal selection signal CH(i) inputted from the horizontal scanning circuit 12 through the control line 12c at a predetermined timing.

Not shown in the drawing because it is not directly relevant as the description of the embodiment, various other signal processing circuits are sometimes included in the components of the solid-state imaging device 1.

<The Description of the Function of the Reference Signal Generating Portion>

Figure 3:
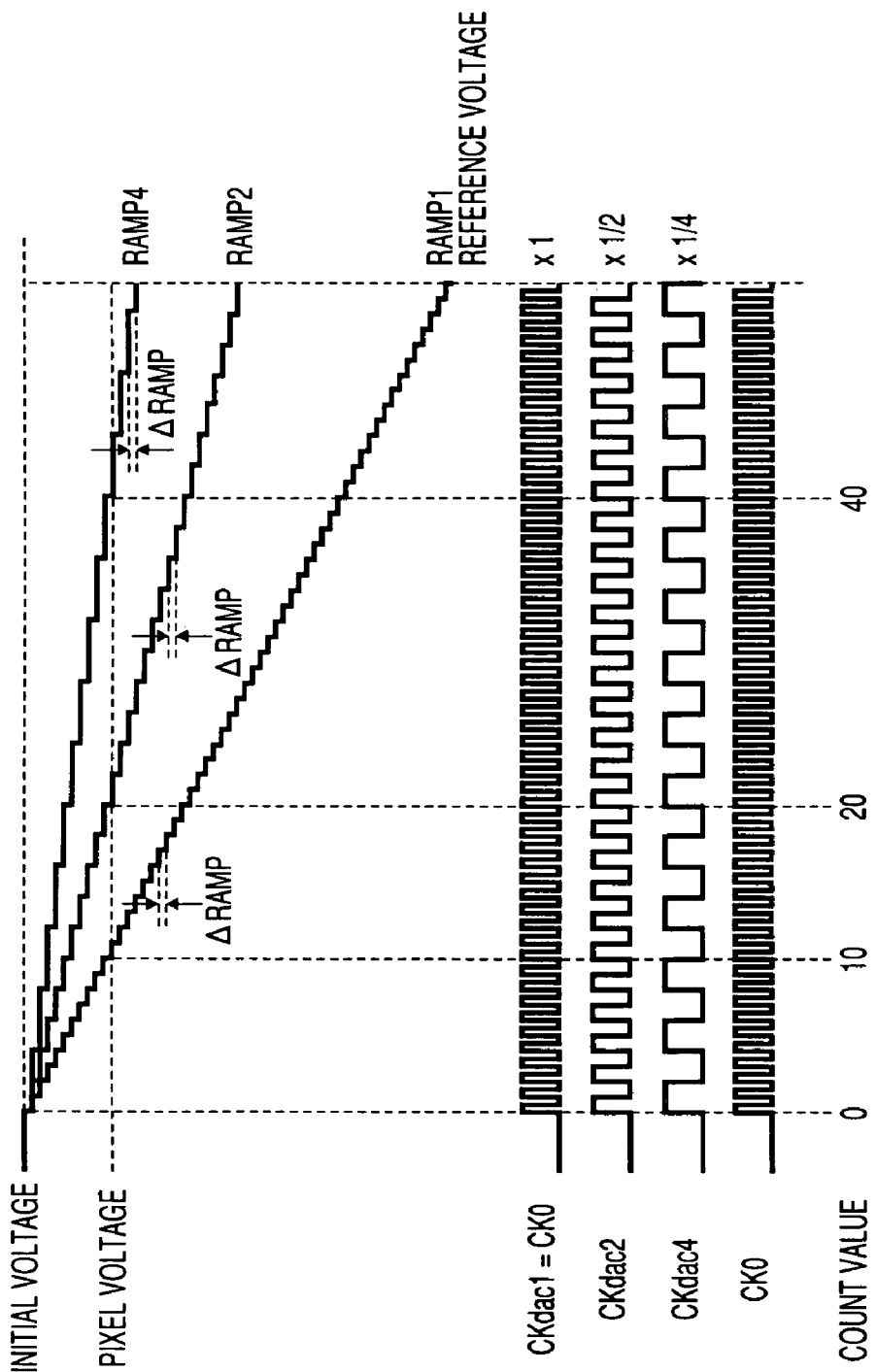
FIG. 3 is a diagram illustrating the function of a DA converter circuit (DAC) of a reference signal generating portion for use in the solid-state imaging device of the first embodiment.

FIG. 3 is a diagram illustrating the function of the DA converter circuit (DAC) in the reference signal generating portion 27 used in the solid-state imaging device 1 of the first embodiment.

The DA converter circuits 27a and 27b receive the DAC count clock CKdac from the communication and timing control portion 20, generate a sawtooth wave in steps (ramp waveform) linearly decreased, for example, in synchronization with the count clocks CKdaca and CKdacb, and feed the generated sawtooth wave as the AD conversion reference voltage (ADC reference signal) to the voltage comparing portion 252 in the column AD circuit 25.

Here, the DA converter circuits 27a and 27b first set the initial voltage based on information that instructs an initial value of the ramp voltage at every comparison process included in the control data CN4, set the voltage change ΔRAMP per clock based on information that instructs a tilt (change rate) of the ramp voltage at every comparison process included in the control data CN4, and then vary the count value one by one by every unit time (count clock CKdac). In practice, it is fine to only set the maximum voltage width with respect to the maximum number of counts for the count clock CKdac (for example, 2.0 by 10 bits). Any circuit configurations are acceptable for setting the initial voltage.

Accordingly, the DA converter circuits 27a and 27b decrease the voltage per ΔRAMP from the voltage indicating the initial value (for example, 3.0 V) included in the control data CN4 at every single count of the clocks CKdaca and CKdacb.

When a coefficient is set with respect to the pixel signal from the unit pixel 3 (more specifically, a true signal component), the communication and timing control portion 20 feeds to the DA converter circuit 27a the count clock CKdacm divided by 1/m with respect to the reference period for the count clock CKdac1 that sets coefficient 1. The DA converter circuit 27a decreases the voltage per ΔRAMP from the voltage indicating the initial value (for example, 3.0 V) included in the control data CN4 at every single count clock CKdacm.

Accordingly, the tilt of the reference signals RAMPa and RAMPb fed to the voltage comparing portion 252 is 1/m times the case where the reference signals RAMPa and RAMPb are generated by the count clock CKdac1 (=CK0), and the count value is m times with respect to the same pixel voltage in the counter portion 254, that is, m can be set as a coefficient.

More specifically, the periods for the count clocks CKdaca and CKdacb are adjusted to change the tilts of the reference signals RAMPa and RAMPb. For example, when a clock divided by 1/m with reference to the reference is used, the tilt is 1/m. When the count clock CK0 is the same in the counter portion 254, the count value is m times with respect to the same pixel voltage in the counter portion 254, that is, m can be set as a coefficient. More specifically, the tilts of the reference signals RAMPa and RAMPb are changed to the coefficient in the differential process, described later, can be adjusted.

As revealed from FIG. 3, the greater the tilts of the reference signals RAMPa and RAMPb are, the smaller the coefficient on the information volume stored in the unit pixel 3 is, whereas the smaller the tilt is, the greater the coefficient is. For example, the count clock CKdac2 divided by ½ with respect to the reference period for the count clock CKdac1 is provided to set the coefficient to '2', whereas the count clock CKdac4 divided by ¼ is provided to set the coefficient to '4'. The count clock CKdacnm divided by n/m is provided to set the coefficient to m/n.

In this manner, the voltage is changed (decreased in the embodiment) per ΔRAMP at every the count clock CKdacm, and the period for the count clock CKdacnm fed to the reference signal generating portion 27 is adjusted. Thus, the coefficient can be set simply and precisely. The count process mode for the signal component Vsig of the pixel signal is adjusted to specify the symbol (+/−) of the coefficient.

The setting scheme of the coefficient using the tilts of the reference signals RAMPa and RAMPb is an example, and the setting scheme is not defined to the scheme like this. Any circuits can be used such that the information that instructs the tilt (change rate) of the ramp voltage included in the control data CN4 adjusts the voltage change ΔRAMP at every single count clock CKdac, including the case where the periods of the count clocks CKdaca and CKdacb fed to the reference signal generating portion 27 are made constant and the potential is outputted that is computed by $y=\alpha$ (initial value)$-\beta*x$, where the counter output value is x, and the tilt (change rate) of the ramp voltage included in the control data CN4 is $\beta$. The adjustment of the tilt of the ramp voltage, that is, the tilt $\beta$ of the RAMP slope can be implemented such that the current amount of the unit current source is varied to adjust ΔRAMP per clock, other than varying the clock number, for example.

For the setting scheme of α (initial value) that can provide the offset and β (coefficient) that can provide the tilt, it may depend on the circuit configuration of generating the ramp waveform that is gradually voltage changed at each of the count clocks CKdaca and CKdacb. As an example, when a circuit that generates the ramp waveform is configured of the combination of the constant current sources and a selector circuit that selects any one of the constant current sources (one or a multiple of a given number), α (initial value) that provides the offset and β (coefficient) that provides the tilt can be both implemented by adjusting the current carried through that constant current source using the constant current source (the detail will be described later).

Regardless of the generation scheme of the reference signal, the reference signal is allowed to have the tilt in accordance with the color property of the color pixel as well as have the initial value based on the viewpoint different from the color property such as the black reference and the offset component of the circuit. Therefore, the AD conversion process can be done by using the preferable reference signal both on the viewpoint of the color property and on the viewpoint different from the color property.

First Embodiment

The Operation of the Solid-State Imaging Device

Figure 4:
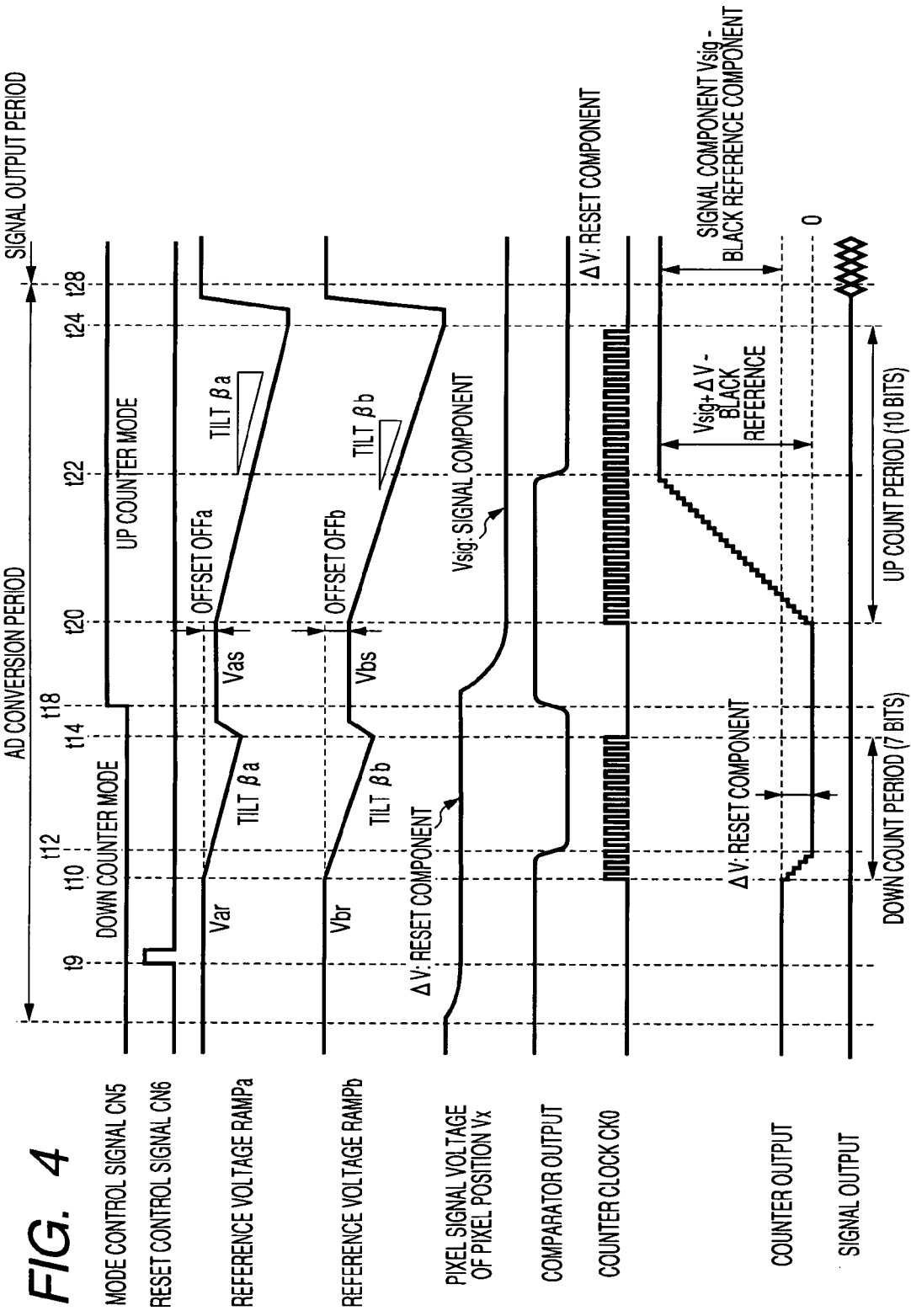
FIG. 4 is a timing chart for describing the basic operation of a column AD circuit of the solid-state imaging device of the first embodiment shown in FIG. 1.

FIG. 4 is a timing chart for describing the signal acquisition differential process that is the basic operation in the column AD circuit 25 of the solid-state imaging device 1 of the first embodiment shown in FIG. 1.

For the scheme that converts the analog pixel signal sensed by each of the unit pixels 3 in the pixel portion 10 to the digital signal, for example, a scheme that obtains the count value corresponding to the magnitude of the reference component and the signal component is adopted in which a point is searched that matches the reference signal RAMP in a ramp waveform dropping by a predetermined tilt with each voltage of the reference component and the signal component in the pixel signal from the unit pixel 3, and the count clock counts the period from the point in time when the reference signal RAMP used in the comparison process is generated to the point in time when the electric signal in accordance with the reference component and the signal component in the pixel signal is matched with the reference signal.

Here, in the pixel signal outputted from the vertical signal line 19, the signal component Vsig appears after the reset component ΔV including noise of the pixel signal being the reference component in time sequence. When a first-time process is done for the reference component (reset component ΔV), a second-time process is a process for the signal that the signal component Vsig is added to the reference component (reset component ΔV). Hereinafter, it will be described more specifically.

For the first time readout, the communication and timing control portion 20 first turns the mode control signal CN5 to low level and sets the counter portion 254 in the down count mode as well as it turns the reset control signal CN6 active for a predetermined period (high level in the embodiment) to reset the count value of the counter portion 254 to the initial value '0' (t9). Then, the first time readout for the vertical signal lines 19 (V0, V1, and so on) from the unit pixels 3 in a given row HX is stable, and subsequently, the communication and timing control portion 20 feeds the control data CN4a and CN4b for generating the reference signals RAMPa and RAMPb to the reference signal generating portion 27.

Consequently, the reference signal generating portion 27 receives it and generates the reference signal RAMPa in the DA converter circuit 27a, the signal has a waveform in steps (RAMP waveform) that is time-varied overall in a sawtooth (RAMP shape) with the tilt βa matched with the color pixel property of one color (R or G in the odd-numbered column) on the row HX, and the portion feeds it as the comparison voltage to one of the input terminals RAMP of the voltage comparing portion 252 in the column AD circuit 25 corresponding to the odd-numbered column.

Similarly, the DA converter circuit 27b generates the reference signal RAMPb having a waveform in steps (RAMP waveform) that is time-varied overall in a sawtooth (RAMP shape) with the tilt βb matched with the color pixel property of the other color (G or B in the even-numbered column) on the HX row, and the portion feeds it as the comparison voltage to one of the input terminals RAMP of the voltage comparing portion 252 in the column AD circuit 25 corresponding to the even-numbered column.

The voltage comparing portion 252 compares the comparison voltage of the RAMP waveform with the pixel signal voltage of a given vertical signal line 19 (Vx) fed from the pixel portion 10.

In order to count the comparison time in the voltage comparing portion 252 by the counter portion 254 disposed at every row at the same time when the reference signals RAMPa and RAMPb are inputted to the input terminal RAMP of the voltage comparing portion 252, the communication and timing control portion 20 inputs the count clock CK0 to the clock terminal of the counter portion 254 in synchronization with the ramp waveform voltage sent from the reference signal generating portion 27 (t10), and the down count is started from initial value '0' as the first time count operation. More specifically, the count process is started in the negative direction.

The voltage comparing portion 252 compares the ramp reference signal RAMP from the reference signal generating portion 27 with the pixel signal voltage Vx inputted through the vertical signal line 19, and it inverts the comparator output from high level to low level when both voltages become the same (t12). More specifically, it compares the voltage signal in accordance with the reset component Vrst with the reference signal RAMP, generates the pulse signal of active low (L) after the time corresponding to the magnitude of the reset component Vrst has elapsed, and feeds it to the counter portion 254.

Consequently, the counter portion 254 stops the count operation nearly at the same time when the comparator output is inverted, and latches (holds and stores) the count value at that time as pixel data to end AD conversion (t12). More specifically, the down count is started at the same time when generating the ramp reference signal RAMP fed to the voltage comparing portion 252, counting is done by the clock CK0 until the pulse signal of active low (L) is obtained by the comparison process, and then the count value corresponding to the magnitude of the reset component Vrst is obtained.

When a predetermined down count period has elapsed (t14), the communication and timing control portion 20 stops feeding the control data to the voltage comparing portion 252 and feeding the count clock CK0 to the counter portion 254. Accordingly, the voltage comparing portion 252 stops generating the ramp reference signal RAMP.

When the first time readout, the voltage comparing portion 252 detects the reset level Vrst in the pixel signal voltage Vx for count operation, and thus the reset component ΔV of the unit pixel 3 is read out.

The reset component ΔV contains noise varying at every the unit pixel 3 as an offset. However, variations in the reset component ΔV are generally small, and the reset level Vrst is mostly in common with all the pixels. Thus, the output value of the reset component ΔV in the pixel signal voltage Vx of a given vertical signal line 19 is nearly known.

Therefore, when the reset component ΔV is read out for the first time, the RAMP voltage can be adjusted to shorten a shortened down count period (t10 to t14: the comparison period). In the embodiment, the maximum period of the comparison process for the reset component ΔV is set to a seven-bit count period (128 clocks) to compare the reset component ΔV.

When the subsequent second time readout, in addition to the reset component ΔV, the electric signal component Vsig in accordance with the incident light quantity at every unit pixel 3 is read out for operation as similar to that of the first time readout. More specifically, the communication and timing control portion 20 first turns the mode control signal CN5 to high level, and sets the counter portion 254 to the up count mode (t18). Then, after the second time readout for the vertical signal lines 19 (V0, V1, and soon) from the unit pixels 3 in a given row HX is stable, in order to conduct the AD conversion process for the signal component Vsig, the communication and timing control portion 20 feeds the control data CN4a for generating the reference signal RAMPa (here, including the offset OFFa and the tilt pa) to the DA converter circuit 27a, and feeds the control data CN4b for generating the reference signal RAMPb (here, including the offset OFFb and the tilt βb) to the DA converter circuit 27b.

In response to this, the reference signal generating portion 27 generates the reference signal RAMPa in the DA converter circuit 27a, and feeds the signal as the comparison voltage to one of the input terminals RAMP of the voltage comparing portion 252 in the column AD circuit 25 corresponding to the odd-numbered column, the signal has a waveform in steps (RAMP waveform) that is time-varied overall in a sawtooth (RAMP shape) with the tilt βa matched with the color pixel property of one color (R or G in the odd-numbered column) on the row HX and drops by the offset OFFa with respect to the initial value Var for the reset component ΔV.

Similarly, the DA converter circuit 27b generates the reference signal RAMPb, and feeds the signal as the comparison voltage to one of the input terminals RAMP of the voltage comparing portion 252 in the column AD circuit 25 corresponding to the even-numbered column, the signal has a waveform in steps (RAMP waveform) that is time-varied overall in a sawtooth (RAMP shape) with the tilt βb matched with the color pixel property of the other color (G or B in the even-numbered column) on the row HX and drops by the offset OFFb with respect to the initial value Vbr for the reset component ΔV.

The voltage comparing portion 252 compares the comparison voltage in the RAMP waveform with the pixel signal voltage of a given vertical signal line 19 (Vx) fed from the pixel portion 10.

As described above, the initial voltage of each reference voltage at this time is computed based on the signal obtained from the pixel generating given multiple black references, and it has different values (the offset OFFa and the offset OFFb) including native variation components generated by the reference signal RAMPa sent from the DA converter circuit 27a and by the reference signal RAMPb sent from the DA converter circuit 27b. The initial voltage of the reference voltage sometimes contains a given offset in addition to the signal obtained from the pixel generating the black reference.

In order to count the comparison time in the voltage comparing portion 252 by the counter portion 254 disposed at every row at the same time when inputting the reference signals RAMPa and RAMPb to the input terminal RAMP of the voltage comparing portion 252, in synchronization with the ramp waveform voltage sent from the reference signal generating portion 27 (t20), the communication and timing control portion 20 inputs the count clock CK0 to the clock terminal of the counter portion 254, and the up count is started for the second time count operation in reverse to the first time from the count value corresponding to the reset component ΔV of the unit pixel 3 obtained at the first time readout. More specifically, the count process is started in the positive direction.

The voltage comparing portion 252 compares the ramp reference signal RAMP from the reference signal generating portion 27 with the pixel signal voltage Vx inputted through the vertical signal line 19, and inverts the comparator output from high level to low level when both voltages become the same (t22). More specifically, it compares the voltage signal in accordance with the signal component Vsig with the reference signal RAMP, generates the pulse signal of active low (L) after the time corresponding to the magnitude of the signal component Vsig, and feeds it to the counter portion 254.

Consequently, the counter portion 254 stops the count operation almost at the same time when the comparator output is inverted, and latches (holds and stores) the count value at that time as pixel data to end AD conversion (t22). More specifically, the down count is started at the same time when generating the ramp reference signal RAMP fed to the voltage comparing portion 252, and counting is done by the clock CK0 until the pulse signal of active low (L) by the comparison process to obtain the count value corresponding to the magnitude of the signal component Vsig.

When a predetermined down count period has elapsed (t24), the communication and timing control portion 20 stops feeding the control data to the voltage comparing portion 252 and feeding the count clock CK0 to the counter portion 254. Accordingly, the voltage comparing portion 252 stops generating the ramp reference signal RAMP.

When the second time readout, the voltage comparing portion 252 detects the signal component Vsig in the pixel signal voltage Vx for count operation, and thus the signal component Vsig of the unit pixel 3 is read out.

Here in the embodiment, the count operation in the counter portion 254 is the down count when the first time readout and the operation is the up count when the second time readout. Thus, subtraction expressed by Equation (1) is done automatically in the counter portion 254, and the count value in accordance with the subtraction result is held in the counter portion 254.

$$\text{(count value in second time comparison period)} - \text{(count value in first time comparison period)} \quad (1)$$

Here, Equation (1) can be modified as Equation (2), and consequently, the count value held by the counter portion 254 is in accordance with the signal component Vsig.

$$\begin{aligned}&\text{(second time comparison period)} - \text{(first time comparison period)} = \text{(signal component Vsig} + \text{reset component }\Delta V + \text{offset component of column AD circuit 25} - \text{(black reference component))} - \text{(reset component }\Delta V + \text{offset component of column AD circuit 25)} = \text{(signal component Vsig)} - \text{(black reference component)} \end{aligned} \quad (2)$$

More specifically, as described above, the subtraction process is conducted in the counter portion 254 by two readouts and the count process such as the down count when the first time readout and the up count when the second time readout, the reset component ΔV containing variations at every unit pixel 3 and the offset component at every column AD circuit 25 can be removed, and only digital data can be extracted by a simple configuration on the signal that the correction of the black reference component is added to the signal component Vsig in accordance with the incident light quantity at every the unit pixel 3. At this time, there are advantages that can remove circuit variations and reset noise.

Accordingly, the column AD circuit 25 of the embodiment operates as the digital converting portion which converts the analog pixel signal to digital pixel data as well as it operates as the CDS (Correlated Double Sampling) processing functional portion.

Since the pixel data indicated by the count value obtained by Equation (2) shows the positive signal voltage, a complementary operation is eliminated to provide high compatibility with existing systems.

Here, when the second time readout, the signal component Vsig in accordance with the incident light quantity is read out. Therefore, in order to determine the magnitude of the light quantity in a wide range, it may be necessary to take the up count period (t20 to t24: comparison period) wide and to greatly change the RAMP voltage fed to the voltage comparing portion 252.

Then, in the embodiment, the maximum period of the comparison process for the signal component Vsig is set to a 10-bit count period (1024 clocks) to compare the signal component Vsig. More specifically, the maximum period of the comparison process for the reset component ΔV (reference component) is made shorter than the maximum period of the comparison process for the signal component Vsig. The maximum periods of the comparison process for both the reset component ΔV (reference component) and the signal component Vsig, that is, the maximum values of the AD conversion period are not made equal, and the maximum period of the comparison process for the reset component ΔV (reference component) is made shorter than the maximum period of the comparison process for the signal component Vsig. Thus, the total AD conversion periods for two times are devised to be short.

In this case, although the comparison bit numbers are varied between the first and second times, the communication and timing control portion 20 feeds the control data to the reference signal generating portion 27 and the reference signal generating portion 27 generates the RAMP voltage based on the control data. Therefore, the tilt of the RAMP voltage, that is, the change rate of the reference signal RAMP is made equal between the first and second times. Since the RAMP voltage is generated under digital control, the tilt of the RAMP voltage is easily made equal between the first and second times. Accordingly, since the accuracy of AD conversion can be made equal, the subtraction result expressed by Equation (1) by the up down counter can be obtained correctly.

The communication and timing control portion 20 instructs the horizontal scanning circuit 12 to read out pixel data at a predetermined timing after the second time count process is finished (t28). Consequently, the horizontal scanning circuit 12 in turn shifts the horizontal selection signals CH(i) fed to the counter portion 254 through the control line 12c.

Accordingly, the count value expressed by Equation (2) and stored and held in the counter portion 254, that is, the pixel data expressed by n-bit digital data is in turn outputted from the output terminal 5c to outside the column processing portion 26 and outside the chip having the pixel portion 10 through n of the horizontal signal lines 18. After that, the same operation is sequentially repeated for every row, and thus image data D1 showing a two-dimensional image can be obtained.

As described above, according to the solid-state imaging device of the first embodiment, the up down counter is used to do the count process for two times as the processing mode is switched. The configuration in which the unit pixels 3 are arranged in rows and columns is configured of the column parallel column AD circuit where the column AD circuit 25 is disposed for every vertical column.

Here, in configuring the AD conversion circuit of the comparator circuit and the counter, the DA converter circuit which is the functional component and generates the AD conversion reference signal fed to the comparator circuit is not prepared by the number of the full colors of the color filters of the color separation filter used for color image pickup, and is prepared by the number of predetermined combinations of colors in accordance with a repeat cycle of colors decided by the color type and arrangement. A processing target row is switched to cause a predetermined combination of colors in that processing target row to switch, and thus the change property (more specifically, a tilt) and the initial value of the reference signal (analog reference voltage) sent by the DA converter circuit are switched in accordance with the property of the color filters, that is, the analog pixel signals.

Accordingly, the number of wirings from the DA converter circuit functioning as the reference voltage generator and the reference voltage generator can be reduced fewer than the number of the color filters forming the color separation filter. The multiplexer is also eliminated, which selectively outputs the analog reference voltage (reference signal) and is necessary when the reference voltage generator is prepared for every color filter. Therefore, the circuit scale can be reduced significantly.

A predetermined combination of colors in a processing target row is switched to cause the change property (more specifically, a tilt) of the reference signal sent from the DA converter circuit to switch. Thus, the reference voltages different from each other in accordance with the property of each color pixel forming the pixel portion 10 are separately generated for the comparison process, the tilt of the reference signal is adjusted in accordance with each color when the analog pixel signal outputted from the unit pixel is converted to digital data, and then the property of each color can be controlled precisely.

In addition to this, the initial value of the reference signal sent by the DA converter circuit is switched and set in accordance with the native variation component generated in the DA converter circuit and the black reference component. Thus, circuit variations can be corrected, and only the signal that is added with the correction of the black reference component can undergo AD conversion with a simple configuration.

The subtraction process of the reference component (reset component) and the signal component can be directly acquired as the second time count result at every vertical column, a memory apparatus which holds the count result of both the reference component and the signal component can be implemented by the latch function in the counter portion, and it is unnecessary to provide a memory apparatus exclusive for use in holding AD converted data separately from the counter.

Moreover, a special subtractor for taking the difference between the reference component and the signal component is eliminated. Therefore, the circuit scale and the circuit area can be reduced less than those of the traditional configuration, and an increase in noise and increases in current and power consumption can be solved.

The column AD circuit (AD converting portion) is configured of the comparing portion and the counter portion. Therefore, the count process can be controlled by a single count clock that operates the counter portion and the control line that switches the count mode not depending on the bit number, the signal line is eliminated that leads the count value of the counter portion required for the traditional configuration to the memory apparatus, and thus increases in noise and in power consumption can be solved.

More specifically, in the solid-state imaging device 1 in which the AD converter is mounted on the same the chip, the voltage comparing portion 252 is paired with the counter portion 254 to configure the column AD circuit 25 as the AD converting portion, the down count is combined with the up count as the operations of the counter portion 254 for use, and the difference between the basic component of a processing target signal (the reset component in the embodiment) and the signal component is formed to be digital data. Thus, problems can be solved including reductions in the circuit scale, circuit area and power consumption, the number of interface wirings to the other functional portions, and noise and current consumption caused by the wiring.

Second Embodiment

The Configuration of the Solid-State Imaging Device

Figure 5:
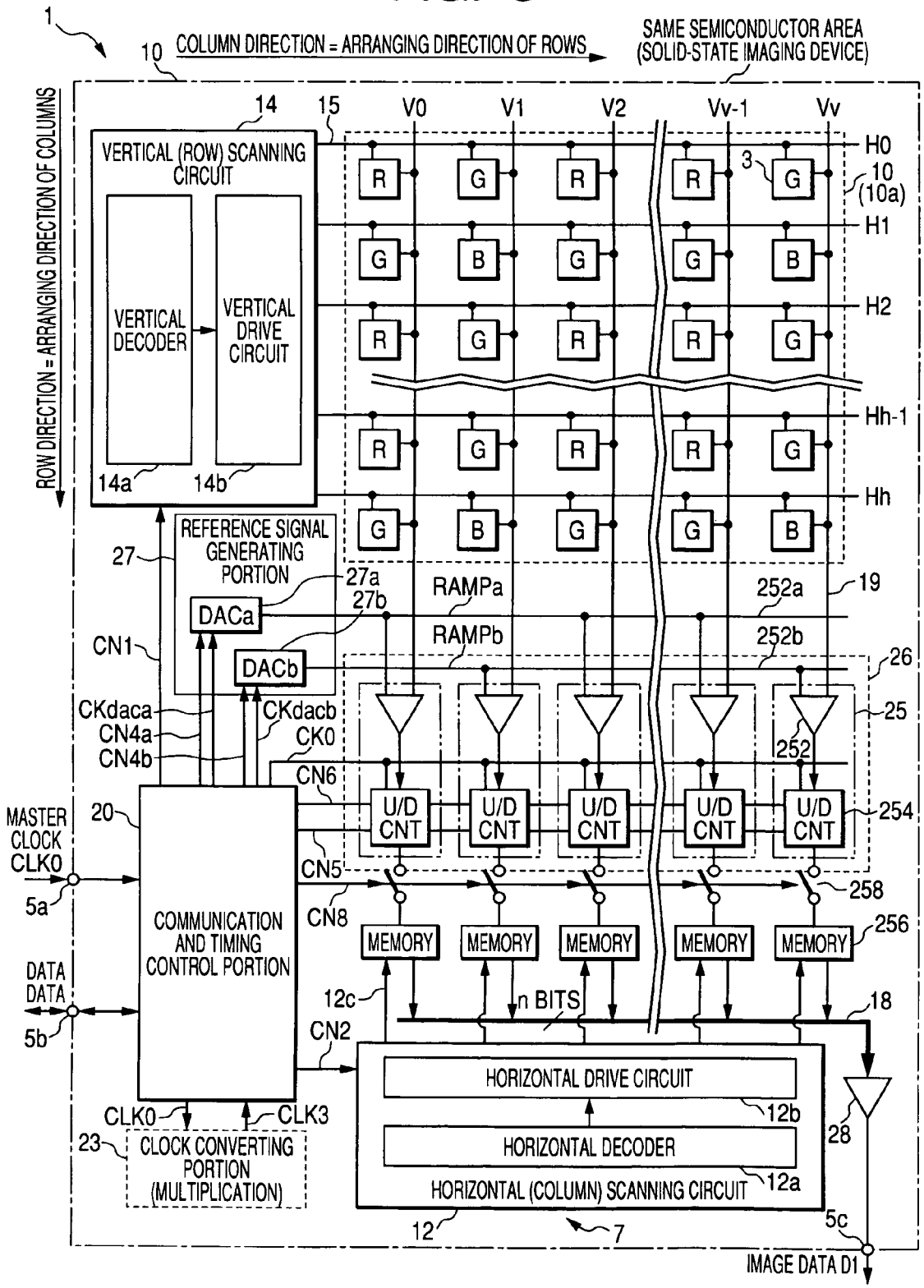
FIG. 5 is a diagram illustrating the outline configuration of a CMOS solid-state imaging device according to a second embodiment of the present invention.

FIG. 5 is a diagram illustrating the outline configuration of a CMOS solid-state imaging device according to a second embodiment of the invention. In the solid-state imaging device 1 of the second embodiment, the configuration of a column AD circuit 25 is modified with respect to the solid-state imaging device 1 of the first embodiment.

More specifically, the column AD circuit 25 of the second embodiment has a data storing portion 256 which is placed in the subsequent stage of a counter portion 254 and is an n-bit memory apparatus holding the count result stored by the counter portion 254, and a switch 258 which is disposed between the counter portion 254 and the data storing portion 256.

To the switch 258, the memory transfer instruction pulse CN8 as the control pulse is fed at a predetermined timing from a communication and timing control portion 20 in common with the switches 258 in the other vertical columns. When the memory transfer instruction pulse CN8 is fed, the switch 258 transfers the count value of the corresponding counter portion 254 to the data storing portion 256. The data storing portion 256 holds and stores the transferred count value.

A scheme that holds the count value of the counter portion 254 at a predetermined timing in the data storing portion 256 is not limited to the configuration of disposing the switch 258 between both portions. For example, the scheme may be implemented as follows. The output enable of the counter portion 254 may be controlled by the memory transfer instruction pulse CN8 as the counter portion 254 is directly connected to the data storing portion 256, and alternatively, the memory transfer instruction pulse CN8 may be used as a latch clock that determines the timing of the data storing portion 256 to acquire data.

To the data storing portion 256, the control pulse is inputted from a horizontal scanning circuit 12 through a control line 12c. The data storing portion 256 holds the count value acquied from the counter portion 254 until it is instructed by the control pulse through the control line 12c.

The horizontal scanning circuit 12 has a function of the readout scanning portion which reads the count value held by each of the data storing portions 256 in parallel with each of the voltage comparing portions 252 and the counter portions 254 of a column processing portion 26 doing their processes.

Second Embodiment

The Operation of the Pipeline Process

FIG. 6 is a timing chart for describing the basic operation in the column AD circuit 25 of the solid-state imaging device 1 of the second embodiment shown in FIG. 5. The AD conversion process in the column AD circuit 25 is the same as that of the first embodiment. Here, the detailed description will be omitted.

The second embodiment has the data storing portion 256 added to the configuration of the first embodiment, and the basic operations including the AD conversion process are the same as those of the first embodiment. However, before the operation of the counter portion 254 (t6), the count result in processing the previous row HX–1 is transferred to the data storing portion 256 based on the memory transfer instruction pulse CN8 from the communication and timing control portion 20.

In the first embodiment, pixel data cannot be output to outside the column processing portion 26 unless after the second time readout process is finished for the pixel signal of a processing target, that is, the AD conversion process is finished, and thus the readout process is constrained. On the other hand, in the configuration of the second embodiment, the count value indicating the previous subtraction process is transferred to the data storing portion 256 prior to the first time readout process (AD conversion process) for the pixel signal of a processing target, and thus the readout process is not constrained.

Therefore, according to the configuration of the second embodiment, the count result held by the counter portion 254 can be transferred to the data storing portion 256. Thus, the count operation of the counter portion 254, that is, the AD conversion process and the readout operation of the count result to the horizontal signal line 18 can be controlled independently, and the pipeline operation can be implemented in which the AD conversion process and the signal readout operation to outside (first to the horizontal signal line 18) are conducted independently in parallel with each other.

Third Embodiment

The Configuration of the Solid-State Imaging Device: Addition of Emerald Pixels

Figure 7:
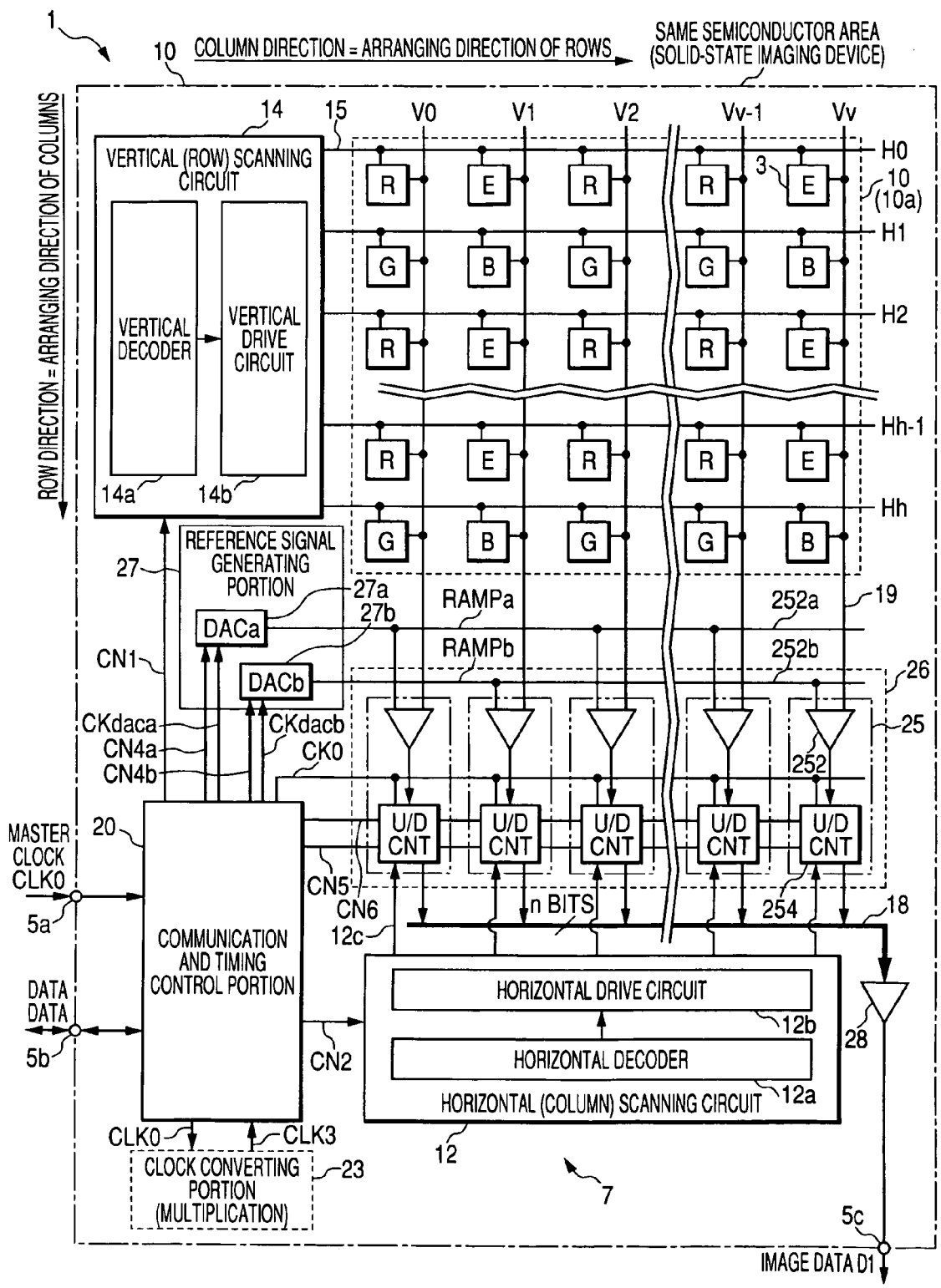
FIG. 7 is a diagram illustrating the outline configuration of a CMOS solid-state imaging device according to a third embodiment of the invention.

FIG. 7 is a diagram illustrating the outline configuration of a CMOS solid-state imaging device according to a third embodiment of the invention. The solid-state imaging device 1 of the third embodiment has a feature in that the color filter arrangement of the color separation filter is modified. More specifically, in the first and second embodiments, three color filters, red (R), green (G), and blue (B), are arranged in accordance with the basic form of the Bayer arrangement for the unit pixels 3 arranged in a square grid, but filter colors and the arrangement order thereof are not defined to the basic form of the Bayer arrangement. For example, the Bayer arrangement may be modified and complementary color filters or the other filter colors may be used.

For example, as shown in FIG. 7, a fourth color pixel which senses a fourth color (emerald: E) may be arranged instead of the second color pixel which senses the second color (green: G) arranged in the odd-numbered row and the even-numbered column.

Also in this case, two color pixels of R/E or G/B varied at every row are arranged in a checkered pattern. The color arrangement like this is the same as the basic form of the Bayer arrangement in that two colors, R/E or G/B, are repeated at every two colors both in the row direction and in the column direction.

More specifically, the fourth color pixel E is added to the color pixels in order to enhance color reproducibility. The overall operation can be formed completely the same as that of the first embodiment. It is fine to be conducted as similar to the first embodiment that a predetermined combination of colors in a processing target row is switched to cause the change property (a tilt) and the initial value of the reference signal sent by the DA converter circuit to switch in accordance with the color filters, that is, the property of the analog pixel signal. The same advantages as those described in the first embodiment can be exerted; the number of the DA converter circuits which functions as the reference voltage generator can be reduced, the multiplexer can be eliminated, the tilt of the reference signal is adjusted in accordance with each color to control the property of each color precisely, or a simple configuration can conduct AD conversion only for the signal added with the correction of the black reference component and the circuit offset component.

The detailed description of the color signal process will be omitted, but an image processor is disposed in the subsequent stage of an output circuit 28, the image processor conducts matrix computation for producing three colors, red, green and blue, close to human eyes from image signals of each color taken in four colors corresponding to four color filters. When the emerald (E) filter is mounted in addition to red (R), green (G), and blue (B) filters, the difference in color reproduction can be reduced more than three color filters do, and the reproducibility of blue green color and red color can be enhanced, for example.

<The Exemplary Configuration of the Reference Signal Generating Portion: First Example>

Figure 8:
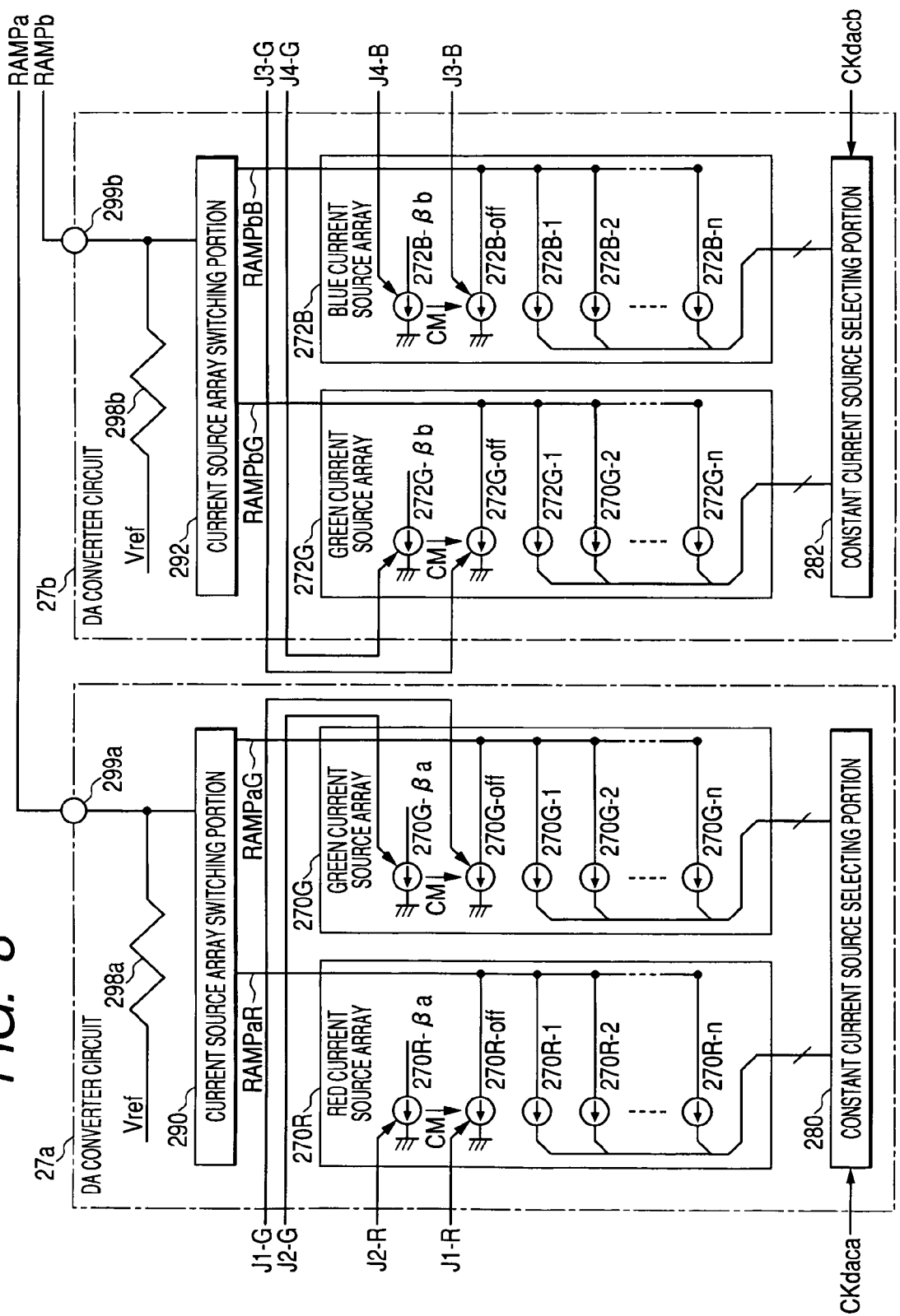
FIG. 8 is a block diagram illustrating a first example of the specific configuration of the reference signal generating portion.

FIG. 8 is a block diagram illustrating a first example of the specific exemplary configuration of the reference signal generating portion 27. The reference signal generating portion 27 of the first example has a first feature as follows. For reference signal generating and outputting portions (DA converter circuits 27a and 27b in the example) which are disposed by the number of color filters in a repeat unit for the color separation filter in the horizontal row direction of a unit of readout, color corresponding reference signal generating portions are disposed by the number of the color filters in a repeat unit for the color filter arrangement with respect to the vertical column direction being the direction different from the horizontal row direction, the color corresponding reference signal generating portion generates and outputs the reference signal having a tilt determined from the viewpoint of the color property of the corresponding color filter and having the initial value determined from the viewpoint different from the color property such as the black level and circuit offset, and a selecting portion is disposed which selects any one of the reference signals independently outputted from the color corresponding reference signal generating portions in accordance with switching a processing target row (switching a unit of readout) and outputs it to the corresponding signal line.

A second feature is as follows. Each of the color corresponding reference signal generating portions is configured to include multiple constant current sources arranged in parallel, a constant current selecting portion is disposed which selects one or multiple sources among multiple constant current sources arranged in parallel based on a predetermined control signal, a change property control portion is disposed which controls the reference signal outputted from the color corresponding reference signal generating portion so as to vary with the change property in accordance with the color property of the color filter by controlling the current carried through the multiple constant current sources arranged in parallel. Particularly, the feature is in that the constant current source selecting portion is disposed for every individual reference signal generating and outputting portion.

A third feature is as follows. The change property control portion is configured of that having a reference constant current source with the current mirror structure with respect to the multiple constant current sources arranged in parallel, the current carried through the reference constant current source is configured to be adjustable, and thus the reference signal outputted from the color corresponding reference signal generating portion varies with the change property in accordance with the color property of the color filter.

A fourth feature is as follows. An initial value setting portion is disposed for each of the color corresponding reference signal generating portions, the initial value setting portion sets the initial value of the reference signal generated by the multiple constant current sources arranged in parallel, the constant current sources are disposed in each of the color corresponding reference signal generating portions, and the initial value of the reference signal outputted from the color corresponding reference signal generating portion can be set based on the non-color property different from the color property of the corresponding color filter such as the black reference and the circuit offset component. Particularly, the feature is in that the initial value setting portion is configured of those having an initial value setting current source which superimposes the current fed to the initial value to the current carried through the multiple constant current sources arranged in parallel, and the current carried through the initial value setting current sources is configured to be adjustable.

More specifically, the reference signal generating portion 27 of the first example shown in FIG. 8 corresponds to the solid-state imaging device 1 of the first and second embodiments having the pixel portion 10 of the Bayer arrangement. First, the DA converter circuit 27a which sends the reference signal RAMPa for one color (R or G in the odd-numbered column) on the row HX is configured to have a constant current source array 270R including multiple constant current sources 270R-1 to 270R-n arranged in parallel corresponding to red in the odd-numbered column and a constant current source array 270G including multiple constant current sources 270G-1 to 270G-n arranged in parallel corresponding to green; and a constant current source selecting portion 280 which selects each constant current source of the individual constant current source arrays 270R and 270G in accordance with a predetermined rule.

The DA converter circuit 27a is configured to include a constant current source array selecting portion 290 which switches to one of the constant current source arrays 270R and 270G in accordance with processing target rows in turn switched; and a resistance potential divider 298a which divides the reference voltage Vref by the combination of the constant current source arrays 270R and 270G.

The connection point of the resistance potential divider 298a to the constant current source array selecting portion 290 is connected to an output end 299a of the DA converter circuit 27a, and the reference signal RAMPa showing a ramp waveform is outputted from the output end 299a.

Similarly, the DA converter circuit 27b which sends the reference signal RAMPb for the other color (G or B in the even-numbered column) on the row HX is configured to include a constant current source array 272G including multiple constant current sources 272G-1 to 272G-n arranged in parallel corresponding to green in the even-numbered column and a constant current source array 272B including multiple constant current sources 272B-1 to 272B-n arranged in parallel; and a constant current source selecting portion 282 which selects each constant current source of the individual constant current source arrays 272G and 272B in accordance with a predetermined rule.

The DA converter circuit 27b is configured to include a constant current source array selecting portion 290 which switches to one of the constant current source arrays 272G and 272B in accordance with processing target rows in turn switched, and a resistance potential divider 298b which divides the reference voltage Vref by the combination of the constant current source arrays 272G and 272B.

The connection point of the resistance potential divider 298b to the constant current source array selecting portion 292 is connected to an output end 299b of the DA converter circuit 27a, and the reference signal RAMPb showing a ramp waveform is outputted form the output end 299b.

The constant current source arrays 270R, 270G, 272G, and 272B are all examples of the individual color corresponding reference signal generating portions which generate and output the reference signal in accordance with the color property of the color filter.

The communication and timing control portion 20 inputs the count clock CKdaca to the constant current source selecting portion 280, and the count clock CKdacb to the constant current source selecting portion 282. The constant current source selecting portions 280 and 282 select one or multiple constant current sources among a predetermined number of constant current sources built in the individual constant current source arrays 270R, 270G, 272G, and 272B at each of the count clocks CKdaca and CKdacb, and thus a sawtooth wave in steps (RAMP voltage) is outputted from the output ends 299a and 299b of the DA converter circuits 27a and 27b as the reference signals RAMPa and RAMPb.

For the constant current sources 270R-1 to 270R-n disposed in the individual constant current source array 270R as a first example, it is fine that all the constant current sources with equally weighted current value are prepared by the number of stages in accordance with the bit number, for example, n=256 for eight bits, and n=1024 for ten bits. For the constant current source selecting portion 280, the constant current source to be turned on is sequentially increased each time when the active edge (for example, a fall edge) of the count clock CKdaca is inputted. With the configuration like this, since the constant current source to be turned on is sequentially increased, no steps are generated in the ramp waveform. For example, it is fine that a counter separately disposed counts by every approximately n=128 or 256 and another constant current source weighted is sequentially turned on.

Alternatively, for the constant current sources 270R-1 to 270R-n disposed in the constant current source array 270R as a second example, they are prepared by the bit number. Each of the constant current sources is weighted by the current value in accordance with bits. A counter circuit is disposed in the constant current source selecting portion 280, and the bit output of the counter circuit turns on/off the bit number of the individual constant current sources. With the configuration like this, although the number of the constant current sources is dramatically reduced fewer than that in the configuration of the first example, it is likely to generate steps in the ramp waveform at the part of carrying over bits because of variations in weighting in accordance with bits and environmental changes such as temperatures.

As the configuration particularly to the first example, the constant current source array 270R has a constant current source 270R-off which sets the offset offaR to the initial value Var for the reset component $\Delta V$ in accordance with the control signal J1-R, and a constant current source 270R-βa which sets the tilt βaR matched with the red color pixel property in the odd-numbered column in accordance with the control signal J2-R.

The constant current source 270R-off is an example of the initial value setting portion which sets the initial value based on the viewpoint different from the color property of the color filter disposed in the unit pixel 3 (unit component) of a processing target. The current carried through the constant current source 270R-off is adjusted by the control signal J1-R to set the initial value Vas for the signal component Vsig, and the offset offaR can be set to the initial value Var for the reset component $\Delta V$ in the reference signal RAMPa in steps outputted from the output end 299a of the DA converter circuit 27a.

The constant current source 270R-βa is an example of the change property control portion which controls the reference signal RAMPaR outputted from the red constant current source array 270R as the color corresponding reference signal generating portion so as to vary with the change property in accordance with the color property of the red color filter by controlling the current carried through the multiple constant current sources 270R-1 to 270R-n in the constant current source array 270R and through the constant current source 270R-off.

The constant current source 270R-βa configures a current mirror (CM) between the constant current sources 270R-1 to 270R-n and the constant current source 270R-off, and there is the proportional relationship between the current carried through the constant current source 270R-pa and the current carried through the constant current source 270R-1 to 270R-n and the constant current source 270R-off. Therefore, the current carried through the constant current source 270R-pa is adjusted by the control signal J2-R, and thus, the current carried through the constant current sources 270R-1 to 270R-n and the constant current source 270R-off, that is, the tilt βaR of the reference signal RAMPaR appeared at the output end of the constant current source array 270R, and consequently, the tilt βaR of the reference signal RAMPa appeared at the output end of the DA converter circuit 27a can be adjusted.

Similarly, the constant current source array 270G has a constant current source 270G-off which sets the offset offaG to the initial value Vag for the reset component $\Delta V$ in accordance with the control signal J1-G, and a constant current source 270G-βa which sets the tilt βbG matched with the green color pixel property in the odd-numbered column in accordance with the control signal J2-G. The constant current source array 272G has a constant current source 272G-off which sets the offset offbG to the initial value vbg for the reset component $\Delta V$ in accordance with the control signal J3-G, and a constant current source 272G-βb which sets the tilt βbG matched with the green color pixel property in the even-numbered column in accordance with the control signal J4-G. The constant current source array 272B has a constant current source 272 B-off which sets the offset offbB to the initial value vbb for the reset component $\Delta V$ in accordance with the control signal J3-B, and a constant current source 272B-βb which sets the tilt βbB matched with the blue color pixel property in the even-numbered column in accordance with the control signal J4-B.

Any one of the constant current source 270G-off, the constant current source 270G-βa, the constant current source 272G-off, the constant current source 272G-βb, the constant current source 272B-off, and the constant current source 272B-βb has the same basic operation of each of the functional portions as that of the constant current source array 270R in the DA converter circuit 27a, omitting the detailed description here.

According to the DA converter circuits 27a and 27b of the first example in this manner, in addition to the configuration of the constant current source array which generates the reference signal showing the RAMP voltage by the combination of the constant current sources and turning on/off the constant current sources, the constant current source 27#@-off (where # is any one of 0 and 2, and @ is any one of R, G, and B) is used to set the offset off to the initial values Va and Vb for the reset component ΔV, and the constant current source 27#@-β* (where # is any one of 0 and 2, @ is any one of R, G, and B, and * is any one of a and b) is similarly used to set the tilt β*@ of the reference signal showing the RAMP voltage. They have an excellent matching with the configuration of the array of the constant current sources 27#@-1 to 27#@-n generating the basic reference signal (parallel arrangement), the tilt βa matched with the pixel property of two colors in a given row or the reference voltage having βb can be generated with a simple configuration, and the offset can also be adjusted. Therefore, there is an advantage to add the black reference component and the correction of the circuit offset.

In the first example, the constant current source 27#@-off which changes the offset and the constant current source 27#@-β* which changes the tilt are disposed for changing the offset and the tilt of the reference signal. For the other schemes, for example, the offset can also be adjusted by directly changing the reference voltage Vref. The tilt can also be adjusted by directly controlling the current amount of the unit current source of the constant current sources 27#@-1 to 27#@-n.

<The Exemplary Configuration of the Reference Signal Generating Portion: Second Example>

Figure 9:
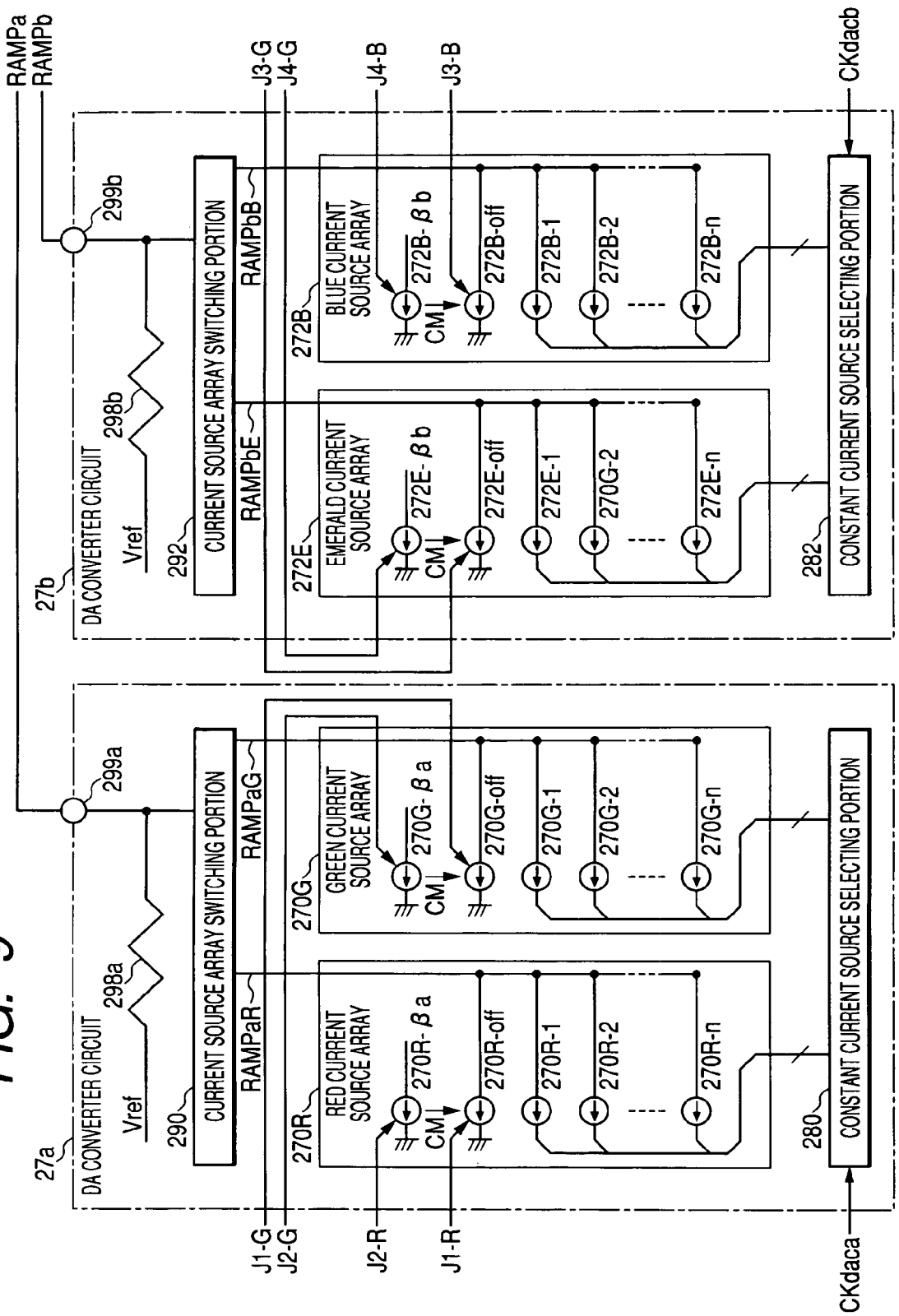
FIG. 9 is a block diagram illustrating a second example of the specific exemplary configuration of the reference signal generating portion.

FIG. 9 is a block diagram illustrating a second example of the specific exemplary configuration of the reference signal generating portion 27. A reference signal generating portion 27 of the second example adopts the configuration of the first example, and corresponds to the solid-state imaging device 1 of the third embodiment to which the emerald pixel is added as the fourth color pixel. Only the constant current source array 272G is altered to a constant current source array 272E, and the basic operation and advantages are the same as those of the first example. Here, the detailed description of the constant current source array 272E will be omitted.

<The Exemplary Configuration of the Reference Signal Generating Portion: Third Example>

Figure 10:
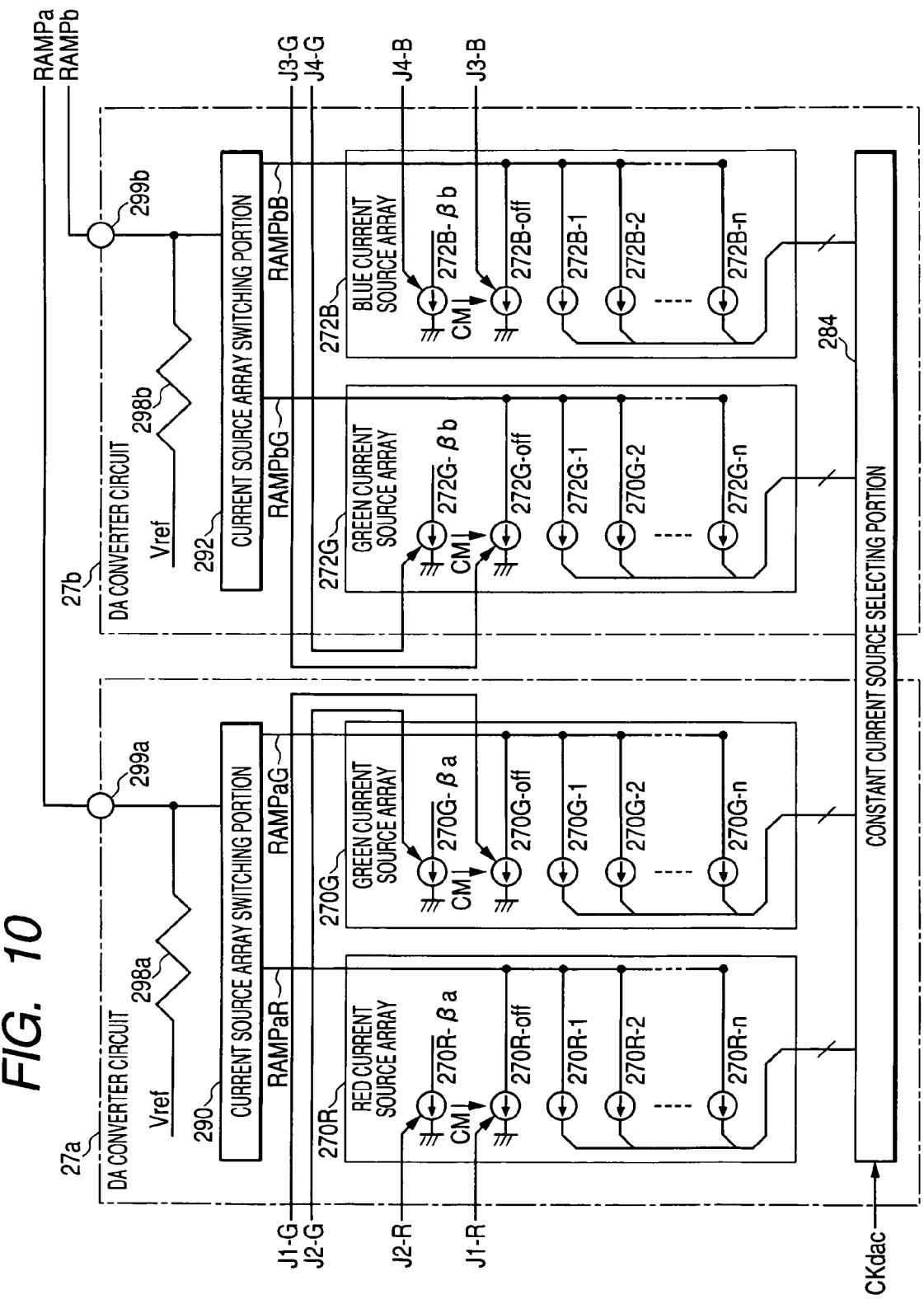
FIG. 10 is a block diagram illustrating a third example of the specific exemplary configuration of the reference signal generating portion.

FIG. 10 is a block diagram illustrating a third example of the specific exemplary configuration of the reference signal generating portion 27. A reference signal generating portion 27 of the third example has a feature in that a constant current source selecting portion which selects one or multiple sources among multiple constant current sources arranged in parallel based on a predetermined control signal is disposed in common with individual reference signal generating and outputting portions.

More specifically, the reference signal generating portion 27 of the third example shown in FIG. 10 corresponds to the solid-state imaging device 1 of the first and second embodiments of the Bayer arrangement having the pixel portion 10. It has a feature in that the constant current source selecting portions 280 and 282 disposed at each of the DA converter circuit 27a and the DA converter circuit 27b in the configuration of the first example are altered to a common constant current source selecting portion 284.

A communication and timing control portion 20 inputs the count clock CKdac to the constant current source selecting portion 284. The constant current source selecting portion 284 selects one or multiple sources among a predetermined number of the constant current sources built in individual constant current source arrays 270R, 270G, 272G and 272B at every count clock CKdac, and thus a sawtooth wave in steps (RAMP voltage) is outputted as the reference signals RAMPa and RAMPb from individual output ends 299a and 299b of DA converter circuits 27a and 27b.

Here, for the selection operations of the constant current source selecting portions 280 and 282 in the configuration of the first example, when the constant current source arrays 270R, 270G, 272G, and 272B are configured similarly, the operations are preferably basically the same. The on/off operation of a single circuit allows the sawtooth wave in steps to be outputted as the reference signals RAMPa and RAMPb from output ends 299a and 299b of the DA converter circuits 27a and 27b.

The configuration of the third example is made focusing attention on this point. With the configuration in this manner, the number of the circuits which selectively switch the constant current sources in the constant current source array can be reduced fewer than that of the configuration of the first example.

<The Exemplary Configuration of the Reference Signal Generating Portion: Fourth Example>

Figure 11:
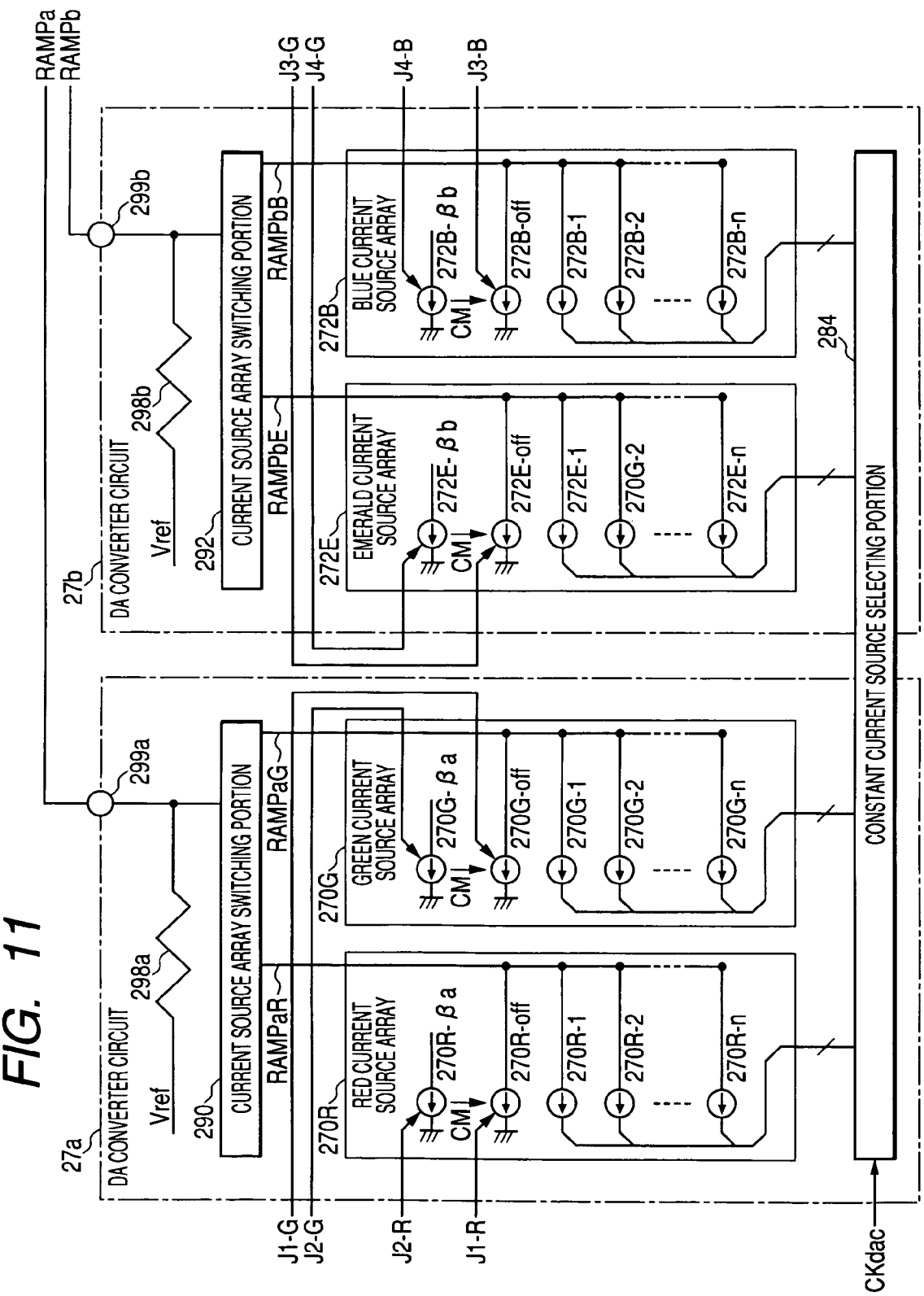
FIG. 11 is a block diagram illustrating a fourth example of the specific exemplary configuration of the reference signal generating portion.

FIG. 11 is a block diagram illustrating a fourth example of the specific exemplary configuration of the reference signal generating portion 27. The reference signal generating portion 27 of the fourth example adopts the configuration of the third example, and corresponds to the solid-state imaging device 1 of the third embodiment to which the emerald pixel is added as the fourth color pixel. Only the constant current source array 272G is altered to a constant current source array 272E, and the basic operation is the same as that of the third example. Here, the detailed description of the constant current source array 272E and a constant current source selecting portion 284 will be omitted.

<The Exemplary Configuration of the Reference Signal Generating Portion: Fifth Example>

Figure 12:
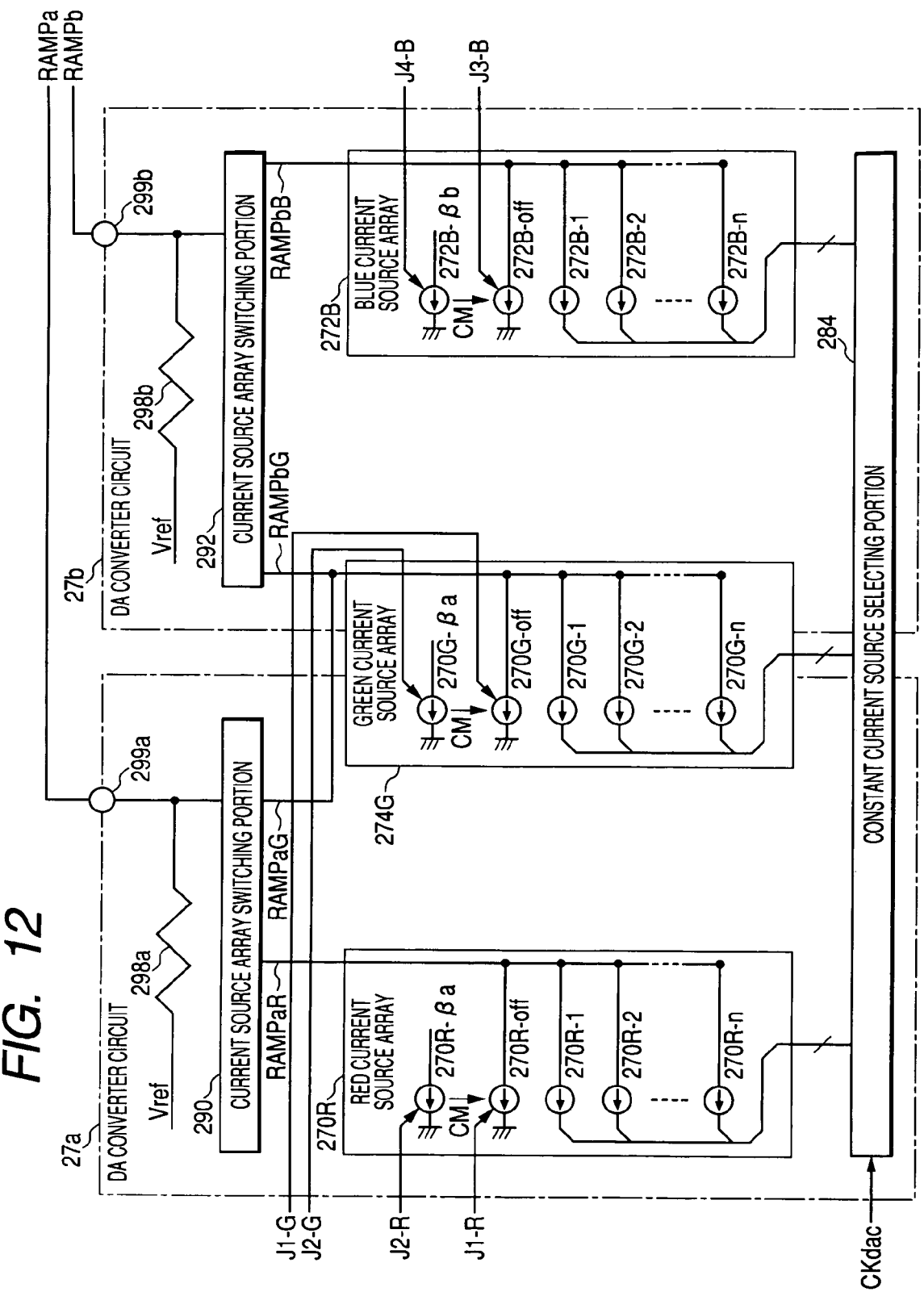
FIG. 12 is a block diagram illustrating a fifth example of the specific exemplary configuration of the reference signal generating portion.

FIG. 12 is a block diagram illustrating a fifth example of the specific exemplary configuration of the reference signal generating portion 27. A reference signal generating portion 27 of the fifth example has a feature as follows. When multiple color filters of the same color exist in a two-dimensional repeat unit of the color separation filter, a first color corresponding reference signal generating portion corresponding to the same color filters is disposed, a second color corresponding reference signal generating portion for independent color components is disposed for individual reference signal generating and outputting portions of the color components that independently exist, and the first color corresponding reference signal generating portion is used in common (shared).

It has a feature in that a selecting portion is disposed which selects any one of the reference signals independently outputted from the first color corresponding reference signal generating portion and the second color corresponding reference signal generating portion in accordance with switching a unit of readout for a processing target (for example, a processing target row) and outputs it to the corresponding signal line.

More specifically, the reference signal generating portion 27 of the fifth example shown in FIG. 12 corresponds to the solid-state imaging device 1 of the first and second embodiments of the Bayer arrangement having the pixel portion 10, and has a feature in that the constant current source array 270G and the constant current source array 272G disposed for each of the DA converter circuit 27a and the DA converter circuit 27b in the configuration of the third example are altered to a common constant current source array 274G. In short, a constant current source array is shared which corresponds to a second color pixel G appeared at two places in the Bayer arrangement.

In accordance with a processing target row, any one of a constant current source array selecting portion 290 and a constant current source array selecting portion 292 selects the constant current source array 270G. More specifically, when a processing target row is the odd-numbered row, the constant current source array selecting portion 290 selects a constant current source array 270R and the constant current source array selecting portion 290 selects the constant current source array 270G. On the other hand, when a processing target row is the even-numbered row, the constant current source array selecting portion 290 selects the constant current source array 270G and the constant current source array selecting portion 290 selects a constant current source array 270B.

With the configuration in this manner, the number of the circuits which selectively switch the constant current sources in the constant current source array and the number of the circuits which select any one of the two constant current source arrays paired in accordance with the Bayer arrangement can be reduced fewer than those in the configurations of the first and third examples.

In the fifth example, although the configuration of the third example is altered so as to share the green constant current source array, the configuration of the first example may be altered so as to share the green constant current source array.

<The Exemplary Configuration of the Reference Signal Generating Portion: Sixth Example>

Figure 13:
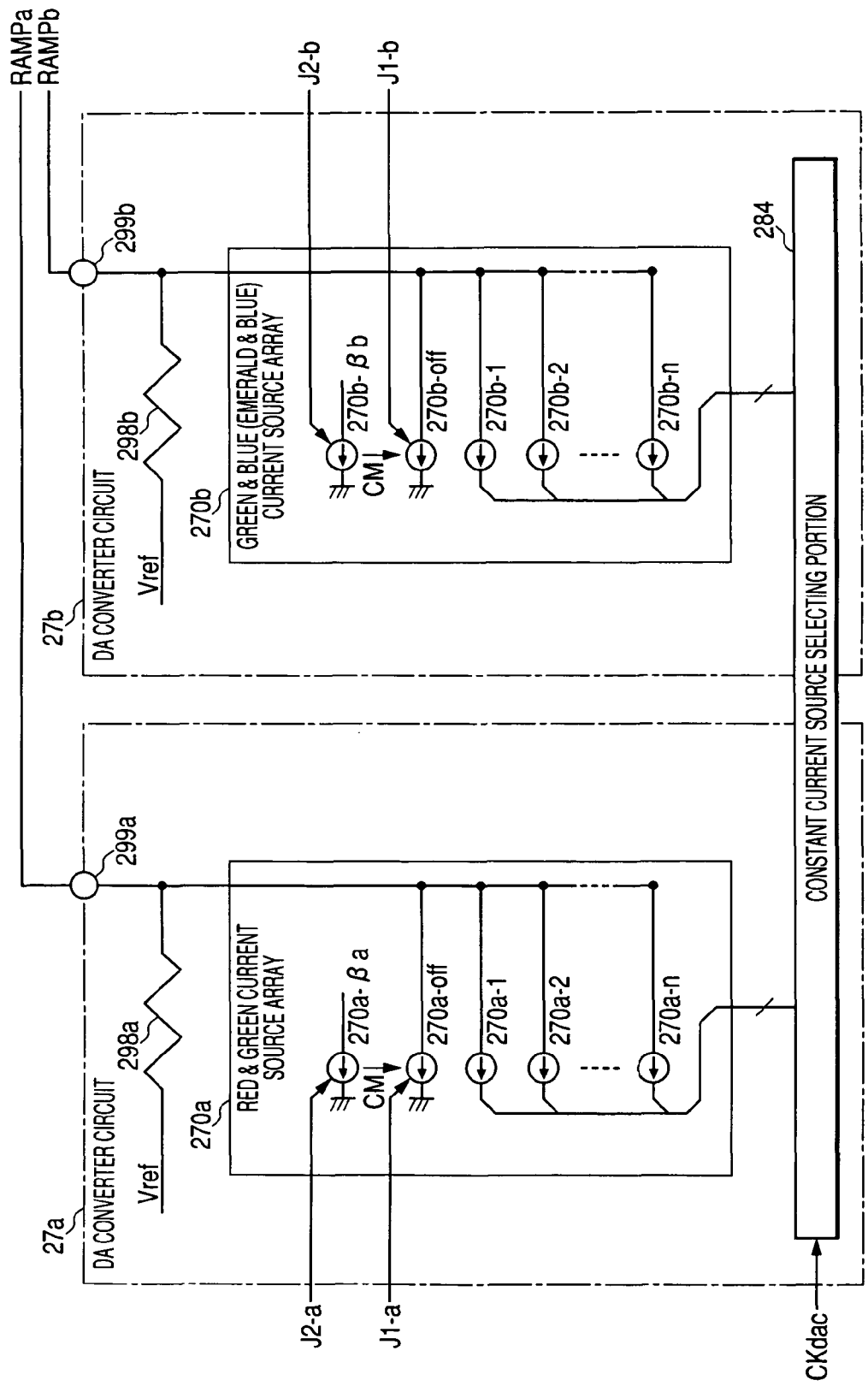
FIG. 13 is a block diagram illustrating a sixth example of the specific exemplary configuration of the reference signal generating portion.
Figure 14:
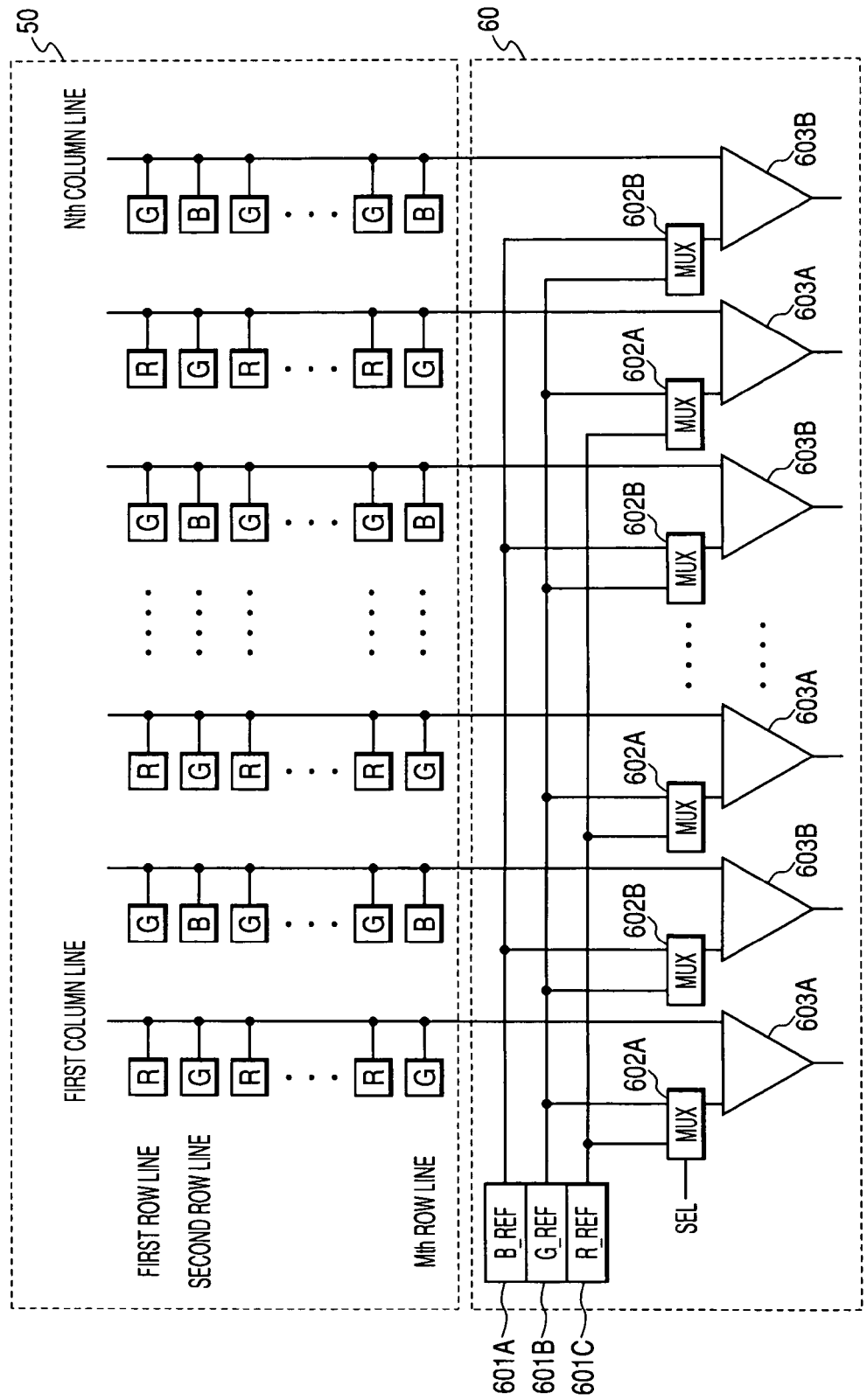
FIG. 14 is a diagram illustrating the outline configuration of a solid-state imaging device shown in FIG. 4 of Patent Reference 1.

FIG. 13 is a block diagram illustrating a sixth example of the specific exemplary configuration of the reference signal generating portion 27. A reference signal generating portion 27 of the sixth example has a feature as follows. The individual color corresponding reference signal generating portions in accordance with the color filter arrangement in the vertical column direction are not disposed for individual DA converter circuits 27a and 27b. A single color corresponding reference signal generating portion is disposed. In accordance with changing the combination of colors forming a repeat unit for color filter arrangement associated with switching at every time when a processing target row is switched, a communication and timing control portion 20 sets the change property (more specifically, a tilt) and the initial value to the DA converter circuit.

For the filter arrangement, it can cope with any types, as long as the repeat cycle for the color separation filter is the two-dimensional matrix in two pixels×two pixels. For example, it can cope with the Bayer arrangement like the first or second embodiment, and the arrangement like the third embodiment having emerald as the fourth color.

For the circuit configuration, the constant current source array selecting portion 290 is first removed from the DA converter circuit 27a, and a single constant current source array 270a as an example of the color corresponding reference signal generating portion is disposed. The output side of the constant current source array 270a is directly connected to an output end 299a.

The constant current source array 270a has a constant current source 270a-off which sets the offset offa to the initial value Var for the reset component ΔV in accordance with the control signal J1-a, and a constant current source 270a-βa which sets the tilt βa matched with the property of red and green color pixels in the odd-numbered column in accordance with the control signal J2-a.

The current carried through the constant current source 270a-off is adjusted by the control signal J1-a to set the initial value Vas for the signal component Vsig, and to set the offset offa to the initial value Var for the reset component ΔV in the reference signal RAMPa in steps outputted from the output end 299a of the DA converter circuit 27a.

The constant current source 270a-βa configures a current mirror (CM) between constant current sources 270a-1 to 270a-n and the constant current source 270a-off, and there is the proportional relationship between the current carried through the constant current source 270a-pa and the current carried through the constant current sources 270a-1 to 270a-n and the constant current source 270a-off. Therefore, the current carried through the constant current source 270a-βa is adjusted by the control signal J2-a, and thus the current carried through the constant current sources 270a-1 to 270a-n and the constant current source 270a-off, that is, the tilt βa appeared at the output end of the DA converter circuit 27a can be adjusted.

Similarly, the constant current source array selecting portion 292 is first removed from the DA converter circuit 27b, and a single constant current source array 270b as an example of the color corresponding reference signal generating portion is disposed. The output side of the constant current source array 270b is directly connected to an output end 299b.

The constant current source array 270b has a constant current source 270b-off which sets the offset offb to the initial value Vbr for the reset component ΔV in accordance with the control signal J1-b, and a constant current source 270b-βb which sets the tilt βb matched with the property of green (or emerald) and blue color pixels in the even-numbered column in accordance with the control signal J2-b.

The current carried through the constant current source 270b-off is adjusted by the control signal J1-b to set the initial value Vbs for the signal component Vsig, and to set the offset offb to the initial value Vbr for the reset component ΔV in the reference signal RAMPb in steps outputted from the output end 299b of the DA converter circuit 27b.

The constant current source 270b-βb configures a current mirror (CM) between constant current sources 270b-1 to 270b-n and the constant current source 270b-off, and there is the proportional relationship between the current carried through the constant current source 270b-βb and the current carried through the constant current sources 270b-1 to 270b-n and the constant current source 270b-off. Therefore, the current carried through the constant current source 270b-βb is adjusted by the control signal J2-b, and thus the current carried through the constant current sources 270b-1 to 270b-n and the constant current source 270b-off, that is, the tilt βb appeared at the output end of the DA converter circuit 27b can be adjusted.

In this manner, for the horizontal row direction being a unit of readout, the color corresponding reference signal generating portions (the constant current source arrays 270a and 270b in the example) are disposed by the number of the color filters that exist in a repeat cycle (arrangement unit) for the color filters, and the change property (more specifically, a tilt) and the initial value are set to the individual DA converter circuits (the constant current source array as an example of the color corresponding reference signal generating portion in the example) in accordance with changing the combination of colors forming a repeat unit for color filter arrangement associated with switching at every time when a processing target row is switched. Thus, it is unnecessary to dispose the color corresponding reference signal generating portions corresponding to each color filter in the vertical column direction and the selecting portion which selects the color corresponding reference signal generating portions in accordance with a processing target row as the first to fifth examples, and the scale of the overall configuration of the reference signal generating portion 27 can be further reduced.

As described above, the invention is described with the embodiments, but the technical scope of the invention is not limited to the range of the embodiments. The embodiments can be modified and improved variously within the scope not deviating from the teachings of the invention, and the forms with such modifications or improvements are also included in the technical scope of invention.

The embodiments do not define the invention claimed in claims, and all the combinations of features described in the embodiments are not necessarily required for units solving the invention. The embodiments described above include the invention in various steps, and various inventions can be extracted from proper combinations of multiple requirements disclosed. Even though some of requirements are removed from all the requirements shown in the embodiments, the configuration from which some requirements are removed can be extracted as the invention as long as the advantage can be obtained.

For example, in the embodiments, the configuration is described in which the DA converter circuits 27a and 27b for two pixels being a repeat unit in the row direction are prepared for the pixel portion where the unit pixels 3 in a square are arranged in a square grid with the color separation filter in a repeat unit of two pixels (in the row direction)×two pixels (in the column direction). However, the repeat unit for the color separation filter is not defined only to two pixels (in the row direction)×two pixels (in the column direction). For example, in the case of three pixels (in the row direction)×two pixels (in the column direction), it is fine to prepare the DA converter circuits for three pixels as a repeat unit in the row direction.

In the embodiments, the pixel portion is described that the unit pixels 3 in a square are arranged in a square grid, but the arrangement of the unit pixels is not defined to the square grid. For example, a skewed grid may be fine that the pixel portion 10 shown in FIG. 1 is arranged as obliquely tilted at an angle of 45 degrees.

The shape of the unit pixel is square when seen in plan, but it is not limited to a square. For example, it may be a hexagon (honeycomb shape). In this case, the arrangement of the unit pixels is done as below, for example. A single unit pixel column and a single unit pixel row both include multiple unit pixels.

Each of multiple unit pixels forming the even-numbered column is shifted to about a half pitch of the unit pixels in each of the unit pixel columns in the column direction with respect to multiple unit pixels forming the odd-numbered column. Similarly, each of multiple the unit pixels forming the even-numbered row is shifted to about a half pitch of the unit pixels in each of the unit pixel rows in the row direction with respect to multiple unit pixels forming the odd-numbered row. Each of the unit pixel columns only includes the unit pixels of the odd-numbered row or the even-numbered row.

A row control line is disposed in order to read out the pixel signal based on the signal charge stored in the charge generating portion for the unit pixels to the column processing portion 26, and the arrangement is done as meandering around the unit pixels 3 in a honeycomb shape. Conversely, each of the unit pixels is placed on the clearances of the hexagon when seen in plan, the clearances are generated by arranging the row control line in a honeycomb shape. Accordingly, the pixels are alternately shifted overall by about a half pitch, and the pixel signal is read out in the vertical direction.

When the unit pixels and the row control line are arranged in a honeycomb shape, a reduction in the light receiving surface area of the charge generating portion is suppressed in the individual unit pixels as well as the pixel density can be improved.

Regardless of the shape and arrangement of the unit pixels, in any cases, when the pixel portion 10 is formed to meet the color image pickup, it is fine to prepare the individual reference signal generating and outputting portions as correspond to each color filter in a repeat unit of the color separation filter in a predetermined direction in accordance with a unit of readout that is made access at the same time. In short, it is fine to prepare the independent reference signal generating and outputting portions by the number of the color filters in a repeat unit of the color separation filter.

In the embodiments, the count process is started from the final count value before switched in the count process after the mode is switched. However, when a synchronous up down counter is used which the count output value is outputted in synchronization with the count clock CK0, this can be implemented without providing any particular schemes.

However, when an up down counter of an asynchronous mode is used which the operation limiting frequency is determined only by the limiting frequency of the first flip flop (counter basic component) with an advantage suitable for the high speed operation, the count value is damaged when the count mode is switched and a problem arises that the normal count operation cannot be done continuously as the value is maintained before and after switched. Therefore, preferably, an adjustment processing portion is disposed which allows starting the count process after the mode is switched from the count value before the mode is switched. The detail of the adjustment processing portion is omitted here. When the adding process is conducted between multiple signals, it is fine to equal each of the count modes in the previous stage and the subsequent stage, and thus the scheme like this is unnecessary.

In the embodiments, the scheme is done in which the signal component Vsig appears after the reset component ΔV (reference component) in the same pixel as the pixel signal is the time sequence, the reset component ΔV (reference component) undergoes the comparison process and the down count process as the first-time process when the true signal component is determined corresponding to the processing portion in the subsequent stage to process the signal of the positive polarity (the greater the signal level is, the greater the positive value is), and the signal component Vsig undergoes the comparison process and the up count process as the second-time process. Regardless of the time sequence where the reference component and the signal component appear, the combination of the target signal component with the count mode and the processing order are freely selected. The digital data obtained by the second-time process is sometimes a negative value depending on the processing order, but in that case, it is fine to do schemes such as symbol inversion and correction computation.

Of course, it may be necessary to read the reset component ΔV (reference component) after the signal component Vsig as the device architecture of the pixel portion 10. When the processing portion in subsequent stage processes the signal of the positive polarity, it is efficient that the signal component Vsig undergoes the comparison process and the down count process as the first-time process and the reset component ΔV (reference component) undergoes the comparison process and the up count process as the second-time process.

In the embodiments, the signal component Vsig appears after the reset component ΔV (reference component) on the same pixel as the pixel signal is the time sequence, and the differential process is done which determines the true signal component at every the pixel signal. When only the signal component Vsig may be the target such that the reset component ΔV (reference component) can be ignored, the differential process which determines the true signal component can be omitted.

In the embodiments, the up down counter is used in common regardless of the operation mode, and the processing mode is switched to do the count process. It is fine to do the count process by combining the down count mode with the up count mode, and the configuration is not defined to the configuration of using the up down counter that can switch the mode.

For example, the combination of the down counter circuit which does the down count process with the up counter circuit which does the up the count process may configure the counter portion. In this case, the configuration that uses a publicly known technique to load a given initial value is acceptable for the counter circuit.

Accordingly, the subtraction process can be done directly between the reference component and the signal component for the output of the counter circuit in the subsequent stage, and a particular adder circuit (or a subtraction circuit) which takes the difference between the individual signals is eliminated. Data transfer to the subtractor that is required for Non-Patent Reference 1 is eliminated, and an increase in noise due to this and increases in current and power consumption can be solved.

When the counter portion is configured by the combination of the down counter circuit with the up counter circuit, the configuration is not excluded that the count value obtained in the first-time count process is not set as the initial value and counting is started from zero for the second-time count process.

In this case, an adder circuit may be necessary which takes the sum of the output Qup (the value in the positive direction) of the up counter circuit and the output Qdown (the value in the negative direction) of the down counter circuit. Also in this case, since the adder circuit is disposed at every AD converting portion configured of the comparing portion and the counter portion, the wiring length can be shortened and an increase in noise due to data transfer and increases in current and power consumption can be solved.

In any configurations as modifications of the counter circuit, the communication and timing control portion 20 can conduct the instruction of the operation for the down counter circuit and the up counter circuit as similar to the embodiments. Both the down counter circuit and the up counter circuit may be operated by the count clock CK0.

In the embodiments, as an example of the solid-state imaging device which can optionally select and read out the signals from the individual unit pixels by address control, the CMOS sensor having the pixel portion is exemplified, the pixel portion in which the unit pixels formed of NMOS or PMOS generating signal charge by receiving sensor light are arranged in rows and columns. Generating signal charge can be adapted to general electromagnetic waves such as infrared rays, ultraviolet rays, and X-rays, not limited to light. The items described in the embodiments can be adapted to semiconductor devices having the unit component in which a large number of elements are arranged that receive the electromagnetic wave to output the analog signal in accordance with that quantity.

What is claimed is:

1. A semiconductor device for use in physical quantity distribution detection comprising:
   an effective area including in a unit component:
   a charge generating portion which generates charge corresponding to an incident electromagnetic wave; and
   a unit signal generating portion which generates an analog unit signal in accordance with the charge generated by the charge generating portion; and
   a reference signal generating portion which generates a reference signal to convert the unit signal to digital data as a functional component to the unit signal to digital data;
   a comparing portion which compares the unit signal with the reference signal generated by the reference signal generating portion; and
   a counter portion which conducts a count process by a predetermined count clock in parallel with the comparison process in the comparing portion and holds a count value at a time when the comparison process in the comparing portion is finished,
   wherein on a surface onto which the electromagnetic wave of the individual charge generating portions enters in the effective area, any one of color filters of a color separation filter formed of a combination of color filters of multiple colors to acquire color information is disposed, and
   the reference signal generating portion has individual reference signal generating and outputting portions which generate and output the reference signal fewer than the number of color components of color filters in a repeat unit for color filter arrangement in a predetermined direction in accordance with a unit of readout and in a direction different from the predetermined direction in accordance with the unit of readout and by the number of the color filters in the repeat unit for color filter arrangement in the predetermined direction in accordance with the unit of readout for the unit signal,
   wherein the individual reference signals independently outputted from the reference signal generating and outputting portions are basically directly transmitted to the comparing portion corresponding to the color filters having a common color property in a predetermined direction through a common signal line.

2. The semiconductor device according to claim 1, wherein the individual reference signal generating and outputting portions generate the reference signal which varies with a change property in accordance with a color property of the color filter disposed in the unit component of a processing target, and change the change property in accordance with changing a combination of colors forming a repeat unit for color filter arrangement, the combination is switched associated with switching the unit of readout for the unit signal.

3. The semiconductor device according to claim 1, wherein the individual reference signal generating and outputting portions have: individual color corresponding reference signal generating portions which generate and output the reference signal in accordance with the color property of the corresponding color filter by the number of the color filters in the repeat unit for color filter arrangement in a direction different from a predetermined direction in accordance with the unit of readout, and a selecting portion which selects any one of the individual reference signals independently outputted from the color corresponding reference signal generating portions in accordance with switching the unit of readout of a processing target and outputs it to a corresponding signal line.

4. The semiconductor device according to claim 3, wherein the color corresponding reference signal generating portion has a change property control portion which controls the reference signal outputted from the color corresponding reference signal generating portion so as to vary with a change property in accordance the color property of the corresponding color filter.

5. The semiconductor device according to claim 1, wherein the individual reference signal generating and outputting portions in common have: a first color corresponding reference signal generating portion which generates and outputs the reference signal in accordance with the color property of the corresponding color filter and is in common used with respect to multiple color components at every color component in the repeat unit for color filter arrangement in a predetermined direction in accordance with the unit of readout and in a direction different from the predetermined direction in accordance with the unit of readout, the individual reference signal generating and outputting portions separately have: a second color corresponding reference signal generating portion which generates and outputs the reference signal in accordance with the color property of the corresponding color filter for an independent color component in the repeat unit for the arrangement at every color component; and a selecting portion which selects any one of the reference signals independently outputted from the first color corresponding reference signal generating portion and the second color corresponding reference signal generating portion in accordance with switching the unit of readout of a processing target and outputs it to a corresponding signal line.

6. The semiconductor device according to claim 5, wherein each of the first and second color corresponding reference signal generating portions has a change property control portion which controls the reference signal outputted from the color corresponding reference signal generating portion so as to vary with a change property in accordance with the color property of the corresponding color filter.

7. The semiconductor device according to claim 1, wherein the individual reference signal generating and outputting portions have: a color corresponding reference signal generating portion which includes multiple constant current sources arranged in parallel and generates and outputs the reference signal; a constant current source selecting portion which selects the multiple constant current sources based on a predetermined control signal; and a change property control portion which controls the reference signal outputted from the color corresponding reference signal generating portion so as to vary with a change property in accordance with the color property of the corresponding color filter by controlling current carried through the multiple constant current sources.

8. The semiconductor device according to claim 7, wherein the change property control portion is configured to have a reference constant current source having a current mirror structure with respect to the multiple constant current sources and to adjust current carried through the reference constant current source.

9. The semiconductor device according to claim 7, wherein the color corresponding reference signal generating portions are disposed by the number of the color filters in a repeat unit for the color filter arrangement in at least any one of a predetermined direction in accordance with the unit of readout and a direction different from the predetermined direction in accordance with the unit of readout.

10. The semiconductor device according to claim 7, wherein the constant current source selecting portion is disposed for each of the individual reference signal generating and outputting portions.

11. The semiconductor device according to claim 7, wherein the constant current source selecting portion is in common disposed with respect to the individual reference signal generating and outputting portions.

12. The semiconductor device according to claim 1, wherein the individual reference signal generating and outputting portions have: an initial value setting portion which sets an initial value based on a viewpoint different from the color property of the color filter disposed in the unit component of a processing target.

13. The semiconductor device according to claim 12, wherein on the side onto which the electromagnetic wave of the individual charge generating portions enters in a reference area except the effective area, it is configured that the unit signal outputted from the unit signal generating portion in the reference area provides a reference level to the unit signal outputted from the unit signal generating portion in the effective area, and the initial value setting portion sets the initial value defined by a viewpoint different from the color property based on the reference level.

14. The semiconductor device according to claim 12, wherein the initial value setting portion sets the initial value defined by a viewpoint different from the color property based on an offset component which is caused by a circuit forming the unit component and the AD converting portion and contained in the unit signal outputted from the unit signal generating portion in the effective area.

15. The semiconductor device according to claim 12, wherein on the side onto which the electromagnetic wave of the individual charge generating portions enters in a reference area except the effective area, it is configured that the unit signal outputted from the unit signal generating portion in the reference area provides a reference level to the unit signal outputted from the unit signal generating portion in the effective area, and the initial value setting portion sets the initial value defined by a viewpoint different from the color property based on an offset component which is caused by a circuit forming the unit component and the AD converting portion and contained in the unit signal outputted from the unit signal generating portion in the effective area.

16. The semiconductor device according to claim 12, wherein the individual reference signal generating and outputting portions have a color corresponding reference signal generating portion which includes multiple constant current sources arranged in parallel and generates and outputs the reference signal, and the initial value setting portion is arranged in parallel with the multiple constant current sources and controls the reference signal outputted from the color corresponding reference signal generating portion so as to vary with the initial value based on a viewpoint different from the color property of the color filter disposed in the unit component of a processing target.

17. The semiconductor device according to claim 16, wherein the initial value setting portion has an initial value setting current source which superimposes current providing the initial value on current carried through the multiple constant current sources arranged in parallel, wherein current carried through the initial value setting current source is configured to be adjustable.

18. The semiconductor device according to claim 1, wherein the counter portion is configured to allow selecting any one of a down count mode and an up count mode to conduct a count process.

19. The semiconductor device according to claim 18, wherein the unit signal is indicated as containing a reference component and a signal component, and the counter portion switches the modes of the count process in accordance with whether the comparing portion is doing the comparison process for any one of the reference component and the signal component.

20. A solid-state imaging device comprising:
   a color filter portion having a plurality of color filters for acquiring color information of light from an object incident on said color filter portion;
   an image sensing portion including pixels that receives the light through said color filter portion;
   AD conversion portion that converts image signals transferred from said image sensing portion to digital signals; and
   a reference signal generating portion that supplies reference signals for said AD conversion portion;
   wherein the reference signal generating portion has individual reference signal generating and outputting portions which generate and output the reference signals fewer than the number of color components of said plurality of color filters in a repeat unit for color filter arrangement in a predetermined direction in accordance with a unit of readout and in a direction different from the predetermined direction in accordance with the unit of readout and by the number of the plurality of color filters in the repeat unit for color filter arrangement in the predetermined direction in accordance with the unit of readout for the unit signal, the individual reference signals independently outputted from the reference signal generating portion are basically directly transmitted to a comparing portion corresponding to the plurality of color filters having a common color property in a predetermined direction through a common signal line.

* * * * *